United States Patent
Hawkins et al.

(10) Patent No.: US 11,537,922 B2
(45) Date of Patent: *Dec. 27, 2022

(54) TEMPORAL PROCESSING SCHEME AND SENSORIMOTOR INFORMATION PROCESSING

(71) Applicant: Numenta, Inc., Redwood City, CA (US)

(72) Inventors: Jeffrey C. Hawkins, Atherton, CA (US); Subutai Ahmad, Palo Alto, CA (US); Yuwei Cui, Lanham, MD (US); Chetan Surpur, Cupertino, CA (US)

(73) Assignee: Numenta, Inc., Redwood City, CA (US)

( * ) Notice: Subject to any disclaimer, the term of this patent is extended or adjusted under 35 U.S.C. 154(b) by 628 days.

This patent is subject to a terminal disclaimer.

(21) Appl. No.: 16/396,519

(22) Filed: Apr. 26, 2019

(65) Prior Publication Data

US 2019/0251465 A1    Aug. 15, 2019

Related U.S. Application Data

(63) Continuation of application No. 14/662,063, filed on Mar. 18, 2015, now Pat. No. 10,318,878.
(Continued)

(51) Int. Cl.
  *G06N 7/00* (2006.01)
  *G06N 3/04* (2006.01)

(52) U.S. Cl.
  CPC ............. *G06N 7/005* (2013.01); *G06N 3/049* (2013.01)

(58) Field of Classification Search
  CPC ........ G06N 3/049; G06N 3/02; G06N 99/005; G05B 13/027; G05B 13/048
  See application file for complete search history.

(56) References Cited

U.S. PATENT DOCUMENTS

| 4,766,534 A | 8/1988 | DeBenedictis |
| 4,845,744 A | 7/1989 | DeBenedictis |

(Continued)

FOREIGN PATENT DOCUMENTS

| EP | 1 557 990 | 7/2005 |
| WO | WO 2006/063291 A | 6/2006 |

(Continued)

OTHER PUBLICATIONS

Mai et al. "Simple Perception—Action Strategy Based on Hierarchical Temporal Memory", IEEE ROBIO, 2013, pp. 1759-1764.*

(Continued)

*Primary Examiner* — Li Wu Chang
(74) *Attorney, Agent, or Firm* — Fenwick & West LLP

(57) ABSTRACT

Embodiments relate to a processing node in a temporal memory system that performs temporal pooling or processing by activating cells where the activation of a cell is maintained longer if the activation of the cell were previously predicted or activation on more than a certain portion of associated cells in a lower node was correctly predicted. An active cell correctly predicted to be activated or an active cell having connections to lower node active cells that were correctly predicted to become active contribute to accurate prediction, and hence, is maintained active longer than cells activated but were not previously predicted to become active. Embodiments also relate to a temporal memory system for detecting, learning, and predicting spatial patterns and temporal sequences in input data by using action information.

20 Claims, 12 Drawing Sheets

Related U.S. Application Data

(60) Provisional application No. 61/955,391, filed on Mar. 19, 2014, provisional application No. 62/106,620, filed on Jan. 22, 2015.

(56) References Cited

U.S. PATENT DOCUMENTS

| | | | |
|---|---|---|---|
| 5,113,507 A | 5/1992 | Jaeckel | |
| 5,255,348 A | 10/1993 | Nenov | |
| 5,712,953 A | 1/1998 | Langs | |
| 5,729,661 A | 3/1998 | Keeler et al. | |
| 5,761,389 A | 6/1998 | Maeda et al. | |
| 6,028,608 A | 2/2000 | Jenkins | |
| 6,122,014 A | 9/2000 | Panusopone et al. | |
| 6,144,711 A | 11/2000 | Raleigh et al. | |
| 6,195,622 B1 | 2/2001 | Altschuler et al. | |
| 6,400,996 B1 | 6/2002 | Hoffberg et al. | |
| 6,468,069 B2 | 10/2002 | Lemelson et al. | |
| 6,567,814 B1 | 5/2003 | Banker et al. | |
| 6,611,726 B1* | 8/2003 | Crosswhite | G06Q 10/087 705/28 |
| 6,615,211 B2 | 9/2003 | Beygelzimer et al. | |
| 6,625,585 B1 | 9/2003 | MacCuish et al. | |
| 6,714,941 B1 | 3/2004 | Lerman et al. | |
| 6,751,343 B1 | 6/2004 | Ferrell et al. | |
| 6,957,241 B2 | 10/2005 | George | |
| 7,088,693 B2 | 8/2006 | George | |
| 7,251,637 B1 | 7/2007 | Caid et al. | |
| 7,308,134 B2 | 12/2007 | Wersing et al. | |
| 7,403,546 B2 | 7/2008 | Van Doninck et al. | |
| 7,613,675 B2 | 11/2009 | Hawkins et al. | |
| 7,620,608 B2 | 11/2009 | Jaros et al. | |
| 7,624,085 B2 | 11/2009 | Hawkins et al. | |
| 7,676,458 B2 | 3/2010 | Aggarwal et al. | |
| 7,739,208 B2 | 6/2010 | George et al. | |
| 7,826,990 B2 | 11/2010 | Nasle et al. | |
| 7,840,395 B2 | 11/2010 | Nasle et al. | |
| 7,840,396 B2 | 11/2010 | Radibratovic et al. | |
| 7,844,439 B2 | 11/2010 | Nasle et al. | |
| 7,844,440 B2 | 11/2010 | Nasle et al. | |
| 7,899,775 B2 | 3/2011 | George et al. | |
| 7,904,412 B2 | 3/2011 | Saphir et al. | |
| 7,937,342 B2 | 5/2011 | George et al. | |
| 7,941,389 B2 | 5/2011 | Marianetti et al. | |
| 7,941,392 B2 | 5/2011 | Saphir | |
| 7,958,280 B2 | 6/2011 | Salessi et al. | |
| 7,983,998 B2 | 7/2011 | George et al. | |
| 8,037,010 B2 | 10/2011 | Jaros et al. | |
| 8,081,209 B2 | 12/2011 | Ji et al. | |
| 8,102,423 B2 | 1/2012 | Cheng | |
| 8,103,603 B2 | 1/2012 | George et al. | |
| 8,112,367 B2 | 2/2012 | George et al. | |
| 8,121,961 B2 | 2/2012 | George et al. | |
| 8,175,981 B2 | 5/2012 | Hawkins et al. | |
| 8,175,984 B2 | 5/2012 | George | |
| 8,175,985 B2 | 5/2012 | Sayfan et al. | |
| 8,195,582 B2 | 6/2012 | Niemasik et al. | |
| 8,219,507 B2 | 7/2012 | Jaros et al. | |
| 8,285,667 B2 | 10/2012 | Jaros et al. | |
| 8,290,886 B2 | 10/2012 | George et al. | |
| 8,504,570 B2 | 8/2013 | Hawkins et al. | |
| 8,645,291 B2 | 2/2014 | Hawkins et al. | |
| 8,666,917 B2 | 3/2014 | Jaros et al. | |
| 8,825,565 B2 | 9/2014 | Marianetti et al. | |
| 9,015,093 B1* | 4/2015 | Commons | G01C 21/3602 706/26 |
| 2002/0002688 A1 | 1/2002 | Gregg et al. | |
| 2002/0150044 A1 | 10/2002 | Wu et al. | |
| 2002/0161736 A1 | 10/2002 | Beygelzimer et al. | |
| 2003/0069002 A1 | 4/2003 | Hunter et al. | |
| 2003/0123732 A1 | 7/2003 | Miyazaki et al. | |
| 2003/0167111 A1 | 9/2003 | Kipersztok et al. | |
| 2004/0002838 A1 | 1/2004 | Oliver et al. | |
| 2004/0142325 A1 | 7/2004 | Mintz et al. | |
| 2004/0148520 A1 | 7/2004 | Talpade et al. | |
| 2004/0267395 A1 | 12/2004 | Discenzo et al. | |
| 2005/0002572 A1 | 1/2005 | Saptharishi et al. | |
| 2005/0028033 A1 | 2/2005 | Kipersztok et al. | |
| 2005/0063565 A1 | 3/2005 | Nagaoka et al. | |
| 2005/0065650 A1 | 3/2005 | Lewis | |
| 2005/0190990 A1 | 9/2005 | Burt et al. | |
| 2005/0222811 A1 | 10/2005 | Jakobson et al. | |
| 2006/0093188 A1 | 5/2006 | Blake et al. | |
| 2006/0161736 A1 | 7/2006 | Huang | |
| 2006/0184462 A1 | 8/2006 | Hawkins | |
| 2006/0212444 A1 | 9/2006 | Handman et al. | |
| 2006/0235320 A1 | 10/2006 | Tan et al. | |
| 2006/0248026 A1 | 11/2006 | Aoyama et al. | |
| 2006/0248073 A1 | 11/2006 | Jones et al. | |
| 2006/0253491 A1 | 11/2006 | Gokturk et al. | |
| 2006/0259163 A1 | 11/2006 | Hsiung et al. | |
| 2007/0005531 A1 | 1/2007 | George et al. | |
| 2007/0019754 A1 | 1/2007 | Raleigh et al. | |
| 2007/0192264 A1 | 8/2007 | Hawkins et al. | |
| 2007/0192267 A1 | 8/2007 | Hawkins et al. | |
| 2007/0192268 A1 | 8/2007 | Hawkins et al. | |
| 2007/0192269 A1 | 8/2007 | Saphir et al. | |
| 2007/0192270 A1 | 8/2007 | Hawkins et al. | |
| 2007/0228703 A1 | 10/2007 | Breed | |
| 2007/0276744 A1 | 11/2007 | Burke | |
| 2007/0276774 A1 | 11/2007 | Ahmad et al. | |
| 2008/0059389 A1 | 3/2008 | Jaros et al. | |
| 2008/0140593 A1 | 6/2008 | George et al. | |
| 2008/0183647 A1 | 7/2008 | Hawkins et al. | |
| 2008/0201286 A1 | 8/2008 | Hawkins et al. | |
| 2008/0208783 A1 | 8/2008 | Jaros et al. | |
| 2008/0208915 A1 | 8/2008 | George et al. | |
| 2008/0208966 A1 | 8/2008 | Edwards et al. | |
| 2009/0006289 A1 | 1/2009 | Jaros et al. | |
| 2009/0116413 A1 | 5/2009 | George | |
| 2009/0150311 A1 | 6/2009 | George | |
| 2009/0240886 A1 | 9/2009 | Sayfan et al. | |
| 2009/0313193 A1 | 12/2009 | Hawkins et al. | |
| 2010/0049677 A1 | 2/2010 | Jaros et al. | |
| 2010/0185567 A1 | 7/2010 | Niemasik et al. | |
| 2010/0191684 A1 | 7/2010 | George | |
| 2010/0207754 A1 | 8/2010 | Shostak et al. | |
| 2010/0312730 A1 | 12/2010 | Weng et al. | |
| 2011/0231351 A1 | 9/2011 | George et al. | |
| 2011/0312730 A1 | 12/2011 | Azimi et al. | |
| 2012/0005134 A1 | 1/2012 | Jaros et al. | |
| 2012/0166364 A1 | 6/2012 | Ahmad et al. | |
| 2012/0197823 A1 | 8/2012 | Hawkins et al. | |

FOREIGN PATENT DOCUMENTS

| | | |
|---|---|---|
| WO | WO 2008/067326 A | 6/2008 |
| WO | WO 2009/006231 A | 1/2009 |

OTHER PUBLICATIONS

Adelson, E.H. et al., "The Perception of Shading and Reflectance," Perception as Bayesian Inference, 1996, pp. 409-423, Knill, D.C. et al., eds., Cambridge University Press, UK.

Agrawal, R. et al., "Mining Sequential Patterns," IEEE, 1995, pp. 3-14.

Ahmad, S. et al., "PowerNuPIC," Numenta, Jun. 2008, Numenta HTM Workshop, Jun. 23-24, 2008, SRI Campus, Menlo Park, CA, fifty-six pages.

Ahmad, S., "NuPIC Jumpstart—Part II," Numenta, May 2008, Numenta HTM Workshop, Jun. 23-24, 2008, SRI Campus, Menlo Park, CA, thirty-three pages.

Aslin, F., "Evaluation of Hierarchical Temporal Memory in Algorithmic Trading," Thesis, Linköpings Universitet, Feb. 8, 2010, 37 pages.

Becerra, J.A. et al., "Multimodule Artificial Neural Network Architectures for Autonomous Robot Control Through Behavior Modulation," IWANN 2003, LNCS, pp. 169-176, vol. 2687.

Biancaniello, P. et al., Multimodal Pattern Recognition with Hierarchical Temporal Memory (MPR), Lockheed Martin Brain-Inspired Computing Research Overview, Numenta HTM Workshop, Jun. 2008, twelve pages.

(56) References Cited

OTHER PUBLICATIONS

Bobier, B., "Content-Based Image Retrieval Using Hierarchical Temporal Memory," Numenta HTM Workshop, Jun. 23-24, 2008, SRI Campus, Menlo Park, CA, seven pages.
Bradski, G. et al., "Fast-Learning VIEWNET Architectures for Recognizing Three-dimensional Objects from Multiple Two-dimensional Views," Neural Networks, 1995, pp. 1053-1080, vol. 8, No. 7/8.
Bryhni, H. et al., "A Comparison of Load Balancing Techniques for Scalable Web Servers," IEEE Network, Jul./Aug. 2000, pp. 58-64.
Ceisel, A. et al., "Using HTM Networks to Decode Neural Signals from the Motor Cortex: A Novel Approach to Brain-Computer Interface Control," Illinois Institute of Technology, Numenta HTM Workshop, 2009, four pages.
Chapela, V., "Preventing Financial Fraud," Smart Security Services, Numenta HTM Workshop, 2009, forty pages.
Chinese Office Action, Chinese Application No. 200580042258.7, dated Jul. 10, 2009, twelve pages.
Chinese Office Action, Chinese Application No. 200780007274.1m dated Jun. 24, 2011, five pages.
Colombe, J., "A Survey of Recent Developments in Theoretical Neuroscience and Machine Vision," Proceedings of the IEEE Applied Imagery Pattern Recognition Workshop, 2003, nine pages.
Cormack, G.V. et al., "Data Compression Using Dynamic Markov Modelling," The Computer Journal, 1987, pp. 541-550, vol. 30, No. 6.
Csapo, A.B. et al., "Object Categorization Using VFA-Generated Nodemaps and Hierarchical Temporal Memories," IEEE International Conference on Computational Cybernetics, Oct. 7, 2007, pp. 257-262.
Curry, C. et al., "Speech Processing with HTM," Numenta HTM Workshop, Jun. 23-24, 2008, SRI Campus, Menlo Park, CA, fifty-seven pages.
Dean, T., "Learning Invariant Features Using Inertial Priors," Annals of Mathematics and Artificial Intelligence, 2006, pp. 223-250, vol. 47.
Demeris, Y. et al., "From Motor Babbling to Hierarchical Learning by Imitation: A Robot Developmental Pathway," Proceedings of the Fifth International Workshop on Epigenetic Robotics: Modeling Cognitive Development in Robotic Systems, 2005, pp. 31-37.
Dicarlo, J. et al., "How Does the Brain Solve Visual Object Recognition?," Neuron 73(3), Feb. 2012, pp. 415-434.
Dimitrova, N. et al., "Motion Recovery for Video Content Classification," ACM Transactions on Information Systems, Oct. 1995, pp. 408-439, vol. 13, No. 4.
Ding, C.H.Q., "Cluster Merging and Splitting in Hierarchical Clustering Algorithms," Proceedings of the 2002 IEEE International Conference on Data Mining (ICDM 2002), Dec. 9, 2002, pp. 139-146.
Dolin, R. et al., "Scalable Collection Summarization and Selection," Association for Computing Machinery, 1999, pp. 49-58.
Dubinsky, D., "Numenta Business Strategy," Numenta, Jun. 2008, Numenta HTM Workshop, Jun. 23-24, 2008, SRI Campus, Menlo Park, CA, fifteen pages.
Dudgeon, M. et al., "Evolved HTM Preprocessing," Qualia Labs, Jun. 25, 2009, nine pages.
Eastman, K. "HTM's & Airline Passenger Behavior: Prediction and Inference Model," Numenta HTM Workshop, 2009, ten pages.
Edsa, "Project Information," Apr. 2008, Numenta HTM Workshop, Jun. 23-24, 2008, SRI Campus, Menlo Park, CA, four pages.
Eswaran, K., "Numenta Lightning Talk on Dimension Reduction and Unsupervised Learning," Numenta HTM Workshop, Jun. 23-24, 2008, SRI Campus, Menlo Park, CA, thirty pages.
European Patent Office, Examination Report, European Application No. 05853611.1, dated Jun. 23, 2008, four pages.
European Patent Office, Examination Report, European Application No. 07750385.2, dated Apr. 21, 2009, eight pages.
European Patent Office, Examination Report, European Patent Application No. 08796030.8, dated Dec. 6, 2010, seven pages.
European Patent Office, Examination Report, European Patent Application No. 11756775.0, dated Jan. 7, 2015, eight pages.
European Patent Office, Examination Report,, European Patent Application No. 07750385.2, dated Dec. 6, 2010, eight pages.
European Patent Office, Supplementary European Search Report and Opinion, European Patent Application No. 11756775.0, dated Oct. 1, 2013, eight pages.
Fan et al., "A Genetic Sparse Distributed Memory Approach to the Application of Handwritten Character Recognition," Pattern Recognition, 1997, pp. 2015-2022, vol. 20, No. 12.
Farahmand, N. et al., "Online Temporal Pattern Learning," Proceedings of the International Joint Conference on Neural Networks, Jun. 14-19, 2009, pp. 797-802, Atlanta, GA, USA.
Felleman, D.J. et al., "Distributed Hierarchical Processing in the Primate Cerebral Cortex," Cerebral Cortex, Jan./Feb. 1991, pp. 1-47, vol. 1.
Fine, S. et al., "The Hierarchical Hidden Markov Model: Analysis and Applications," Machine Learning, 1998, pp. 41-62, vol. 32, Kluwer Academic Publishers, Boston.
Finley, M., "Exploration of Motion Capture," Qualia Labs, Jun. 24, 2008, Numenta HTM Workshop, Jun. 23-24, 2008, SRI Campus, Menlo Park, CA, thirty-six pages.
Foldiak, P., "Learning Invariance from Transformation Sequences," Neural Computation, 1991, pp. 194-200, vol. 3, No. 2.
Fukushima, K., "Neocognitron: A Self-Organizing Neural Network Model for a Mechanism of Pattern Recognition Unaffected by Shift in Position," Biol. Cybernetics, 1980, pp. 193-202, vol. 36.
Garalevicius, S., "Memory-Prediction Framework for Pattern Recognition: Performance and Suitability of the Bayesian Model of Visual Cortex," American Association of Artificial Intelligence, 2007, six pages.
George, D. "Thesis: How the Brain Might Work," Dept. of Electrical Engineering and the Committee on Graduate Studies of Stanford University, Jun. 2008, one-hundred ninety-one pages.
George, D. et al., "A Hierarchical Bayesian Model of Invariant Pattern Recognition in the Visual Cortex," Proceedings, 2005 IEEE International Joint Conference on Neural Networks, Jul. 31-Aug. 4, 2005, pp. 1812-1817, vol. 3.
George, D. et al., "Invariant Pattern Recognition Using Bayesian Inference on Hierarchical Sequences," Technical Report, Oct. 2004, eight pages.
George, D. et al., "The HTM Learning Algorithms," Mar. 1, 2007, 44 pages. [Online] [Retrieved on Sep. 22, 2011] Retrieved from the Internet <URL:http://www.numenta.com/htm-overview/education/Numenta_HTM_Learning_Algos.pdf.>.
George, D. et al., "Towards a Mathematical Theory of Cortical Micro-circuits," PLoS Computational Biology, Oct. 2009, vol. 5, Issue 10, twenty-six pages.
Gerstner, W. et al., "Spiking Neuron Models. Single Neurons, Populations, Plasticity," Cambridge University Press, 2002, ten pages.
Gottschalk, K. et al., "Introduction to Web Services Architecture," IBM Systems Journal, 2002, pp. 170-177, vol. 41, No. 2.
Guerrier, P., "A Generic Architecture for On-Chip Packet-Switched Interconnections," Association for Computing Machinery, 2000, pp. 250-256.
Guinea, D. et al., "Robot Learning to Walk: An Architectural Problem for Intelligent Controllers," Proceedings of the 1993 International Symposium on Intelligent Control, Aug. 1993, pp. 493-498, Chicago, USA.
Guo, C-E. et al., "Modeling Visual Patterns by Integrating Descriptive and Generative Methods," International Journal of Computer Vision, May 29, 2003, pp. 5-29, vol. 53, No. 1.
Haitani, R. et al., "Vitamin D Toolkit, Introduction," Jun. 24, 2008, Numenta HTM Workshop, Jun. 23-24, 2008, SRI Campus, Menlo Park, CA, eleven pages.
Haitani, R., "Smart Video: A Disruptive Market Opportunity for HTM," Numenta HTM Workshop, 2009, twelve pages.
Han, K. et al., "Automated Robot Behavior Recognition Applied to Robotic Soccer," In Proceedings of the IJCAI-99 Workshop on Team Behaviors and Plan Recognition, 1999, six pages.

(56) References Cited

OTHER PUBLICATIONS

Haritaoglu, I. et al., "W4: Real-Time Surveillance of People and Their Activities," IEEE Transactions on Pattern Analysis and Machine Intelligence, Aug. 2000, pp. 809-830, vol. 22, No. 8.
Hartung, J. et al., "Presentation: Support for the Use of Hierarchical Temporal Memory Systems in Automated Design Evaluation: A First Experiment," Numenta HTM Workshop, 2009, thirty-one pages.
Hartung, J. et al., "Support for the Use of Hierarchical Temporal Memory Systems in Automated Design Evaluation: A First Experiment," Proceedings of the ASME 2009 Int'l. Design Engineering Technical Conferences & Computers and Information in Engineering Conference, Aug. 30-Sept. 2, 2009, ten pages, San Diego, CA, USA.
Hasegawa, Y. et al., "Learning Method for Hierarchical Behavior Controller," Proceedings of the 1999 IEEE International Conference on Robotics & Automation, May 1999, pp. 2799-2804.
Hawkins, J. "Hierarchical Temporal Memory: History-Progress-Today-Tomorrow," HTM Workshop, Jun. 2009, twenty-four pages.
Hawkins, J. "New Ideas About Temporal Pooling," Numenta, Jan. 22, 2014, pp. 1-153.
Hawkins, J. "Prediction Toolkit Overview," Numenta HTM Workshop, 2009, four pages.
Hawkins, J. et al., "Hierarchical Temporal Memory, Concepts, Theory, and Terminology," Numenta, May 10, 2006, pp. 1-19.
Hawkins, J. et al., "Hierarchical Temporal Memory: Concepts, Theory and Terminology," Numenta, Inc., Mar. 27, 2007, 20 pages. [Online] [Retrieved on Sep. 22, 2011] Retrieved from the Internet<URL:http://www.numenta.com/htm-overview/education/Numenta_HTM_Concepts.pdf.>.
Hawkins, J. et al., "On Intelligence," Sep. 2004, Times Books, Henry Holt and Company, New York, NY 10011.
Hawkins, J. et al., "Sequence Memory for Prediction, Inference and Behaviour," Philosophical Transactions of The Royal Society B, Mar. 31, 2009, pp. 1203-1209, vol. 364. [Online] [Retrieved Sep. 22, 2011] Retrieved from the Internet <URL:http://rstb.royalsocietypublishing.org/content/364/1521/1203.full.pdf.>.
Hawkins, J., "Why Can't a Computer Be More Like a Brain?" IEEE Spectrum, Apr. 1, 2007, pp. 21-26, vol. 44, No. 4.
Hernandez-Gardiol, N. et al., "Hierarchical Memory-Based Reinforcement Learning," Proceedings of Neural Information Processing Systems, 2001, seven pages.
Hinton, G.E. et al., "The "Wake-Sleep" Algorithm for Unsupervised Neural Networks," Science, May 26, 1995, pp. 1158-1161, vol. 268.
Hoey, "Hierarchical unsupervised learning of facial expression categories," IEEE, 2001, 0-7695-1293-3, pp. 99-106.
Hyvarinen, A. et al., "Bubbles: A Unifying Framework for Low-Level Statistical Properties of Natural Image Sequences," J. Opt. Soc. Am. A., 2003, pp. 1237-1252, vol. 20, No. 7.
Isard, M. et al., "ICONDENSATION: Unifying Low-Level and High-Level Tracking in a Stochastic Framework," Lecture Notes in Computer Science 1406, 1998, pp. 893-908, Burkhardt, H. et al., ed., Springer-Verlag, Berlin.
Ison, M. et al., "Selectivity and Invariance for Visual Object Perception," Frontiers in Bioscience: A Journal and Virtual Library, 2008, pp. 4889-4903.
Kim, J. et al., "Hierarchical Distributed Genetic Algorithms: A Fuzzy Logic Controller Design Application," IEEE Expert, Jun. 1996, pp. 76-84.
Kuenzer, A. et al., "An Empirical Study of Dynamic Bayesian Networks for User Modeling," Proceedings of the UM 2001 Workshop on Machine Learning, ten pages.
Lee, T.S. et al., "Hierarchical Bayesian Inference in the Visual Cortex," J. Opt. Soc. Am. A. Opt. Image. Sci. Vis., Jul. 2003, pp. 1434-1448, vol. 20, No. 7.
Lenser, S. et al., "A Modular Hierarchical Behavior-Based Architecture," RoboCup 2001, LNAI 2377, 2002, pp. 423-428, Birk, A. et al., (eds.), Springer-Verlag, Berlin, Heidelberg.
Levinson, S. et al., "Automatic Language Acquisition for a Mobile Robot," Feb. 2005, Numenta HTM Workshop, Jun. 23-24, 2008, SRI Campus, Menlo Park, CA, twenty-seven pages.
Lewicki, M.S. et al., "Bayesian Unsupervised Learning of Higher Order Structure," Proceedings of the 1996 Conference in Advances in Neural Information Processing Systems 9, pp. 529-535.
Lim, "Estimation of Occlusion and Dense Motion Fields in a Bidirectional Bayesian Framework," IEEE Transactions on Pattern Analysis and Machine Intelligence, 2002, pp. 712-718, vol. 24, No. 5.
Lo, J. "Unsupervised Hebbian Learning by Recurrent Multilayer Neural Networks for Temporal Hierarchical Pattern Recognition," Information Sciences and Systems 44th Annual Conference on Digital Object Identifier, 2010, pp. 1-6.
Mahadevan, S. et al., "Validation of reliability computational models using Bayes networks," Reliability Engineering & System Safety, 2005, pp. 223-232, vol. 87.
Majure, L., "Unsupervised Phoneme Acquisition Using HTM," Jun. 25, 2009, eight pages.
Mannes, C., "A Neural Network Model of Spatio-Temporal Pattern Recognition, Recall and Timing," Technical Report CAS/CNS-92-013, Feb. 1992, Department of Cognitive and Neural Systems, Boston University, USA, seven pages.
Mari, J.-.F et al., "Temporal and Spatial Data Mining with Second-Order Hidden Markov Models," Soft Computing—A Fusion of Foundations, Methodologies and Applications, 2006, pp. 406-414, vol. 10, No. 5.
McDowell, C. et al., "SlugGo, a Computer Go Program," Numenta HTM Workshop, Jun. 23-24, 2008, SRI Campus, Menlo Park, CA, eighteen pages.
Miller, J. W. et al., "Biomimetic Sensory Abstraction Using Hierarchical Quilted Self-Organizing Maps," Society of Photo-Optical Instrumentation Engineers, 2006, eleven pages.
Mishkin, M. et al., "Hierarchical Organization of Cognitive Memory," Phil. Trans. R. Soc. B., 1997, pp. 1461-1467, London.
Mitrovic, A., "An Intelligent SQL Tutor on the Web," International Journal of Artificial Intelligence in Education, 2003, pp. 171-195, vol. 13.
Muckli, L., "Predictive Coding in Apparent Motion," University of Glasgow, Numenta HTM Workshop, Jun. 25, 2009, twelve pages.
Murphy, K. et al., "Using the Forest to See the Trees: A Graphical Model Relating Features, Objects and Scenes," Advances in Neural Processing System, 2004, vol. 16, eight pages.
Murray, S.O. et al., "Shaper Perception Reduces Activity in Human Primary Visual Cortex," Proceedings of the Nat. Acad. Of Sciences of the USA, Nov. 2002, pp. 15164-151169, vol. 99, No. 23.
Nair, D. et al., "Bayesian Recognition of Targets by Parts in Second Generation Forward Looking Infrared Images," Image and Vision Computing, 2000, pp. 849-864, vol. 18.
Namphol, A. et al., "Image Compression with a Hierarchical Neural Network," IEEE transactions on Aerospace and Electronic Systems, Jan. 1996, pp. 326-338, vol. 32, No. 1.
Naphade, M. et al., "Discovering Recurrent Events in Video Using Unsupervised Methods," IEEE /GIP, 2002, pp. II-13 through II-16.
Naphade, M. et al., "A Probabilistic Framework for Semantic Video Indexing, Filtering, and Retrieval," IEEE Transactions on Multimedia, Mar. 2001, pp. 141-151, vol. 3, No. 1.
Niemasik, J. "Vision Toolkit," Numenta HTM Workshop, 2009, twenty-eight pages.
Numenta, Inc., "Business Strategy," Numenta HTM Workshop, 2009, fifteen pages.
Numenta, Inc., "Hierarchical Temporal Memory including HTM Cortical Learning Algorithms, Version 0.2.1," Sep. 12, 2011, sixty-eight pages. [Online] [Retrieved Sep. 22, 2011] Retrieved from the Internet <URL:http://www.numenta.com/htm-overview/education/HTM_CorticalLearningAlgorithms.pdf.>.
Numenta, Inc., "Hierarchical Temporal Memory: Comparison with Existing Models, Version 1.01," Mar. 1, 2007, four pages.
Numenta, Inc., "HTM Algorithms," Jun. 2008, Numenta HTM Workshop, Jun. 23-24, 2008, SRI Campus, Menlo Park, CA, sixty-seven pages.

(56) References Cited

OTHER PUBLICATIONS

Numenta, Inc., "HTM Workshop, Jumpstart," Jun. 2008, Numenta HTM Workshop, Jun. 23-24, 2008, SRI Campus, Menlo Park, CA, eighty-six pages.
Numenta, Inc., "Numenta Node Algorithms Guide NuPIC 1.6," Numenta, Jul. 22, 2008, pp. 1-7.
Numenta, Inc., "Numenta Node Algorithms Guide NuPIC 1.6," Numenta, Jun. 13, 2008, pp. 1-6.
Numenta, Inc., "Numenta Platform for Intelligent Computing: Programmer's Guide Version 1.0," Mar. 2007, 177 pages.
Numenta, Inc., "NuPIC Update," Numenta HTM Workshop, 2009, twenty-four pages.
Numenta, Inc., "Problem Solving with HTMs," Jun. 2008, Numenta HTM Workshop, Jun. 23-24, 2008, SRI Campus, Menlo Park, CA, twenty-three pages.
Numenta, Inc., "Prototype to Demonstrate Automated Insect Detection and Discrimination," Numenta HTM Workshop, 2009, four pages.
Numenta, Inc., "Smart Music: Combining Musical Expectations with Algorithmic Composition," Numenta HTM Workshop, 2009, seven pages.
Numenta, Inc., "Technical Keynote," Numenta HTM Workshop, 2009, seventy-two pages.
Numenta, Inc., "Temporal Model Characteristics," Numenta HTM Workshop, 2009, fourteen pages.
Numenta, Inc., "Vision Framework," Jun. 2008, Numenta HTM Workshop, Jun. 23-24, 2008, SRI Campus, Menlo Park, CA, thirty-six pages.
Numenta, Inc., "What Have We Worked on Since the 2008 Workshop? Customer Applications Presentation," Numenta HTM Workshop, 2009, thirty-five pages.
Numenta, Inc., "Zeta1 Algorithms Reference, Version 1.0," Numenta Inc., Mar. 1, 2007, pp. 1-36.
Numenta, Inc., "Zeta1 Algorithms Reference, Version 1.2," Numenta Inc., Jun. 8, 2007, pp. 1-38.
Numenta, Inc., "Zeta1 Algorithms Reference, Version 1.3," Numenta Inc., Aug. 22, 2007, pp. 1-41.
Numenta, Inc., "Zeta1 Algorithms Reference, Version 1.5," Numenta Inc., Aug. 24, 2007, pp. 1-45.
Olshausen, B.A. et al., "A Neurobiological Model of Visual Attention and Invariant Pattern Recognition Based on Dynamic Routing Information," Journal of Neuroscience, Nov. 1993, pp. 4700-4719, vol. 13, No. 11.
Park, S. et al., "Recognition of Two-person Interactions Using a Hierarchical Bayesian Network," ACM SIGMM International Workshop on Video Surveillance (IWVS) 2003, pp. 65-76, Berkeley, USA.
"Partial Transcript from Numenta HTM Workshop DVD Disc 1," Numenta, Jun. 2008, 6 pages.
PCT International Search Report and Written Opinion, PCT Application No. PCT/US07/85661, dated Jun. 13, 2008, six pages.
PCT International Search Report and Written Opinion, PCT Application No. PCT/US08/55352, dated Aug. 1, 2008, seven pages.
PCT International Search Report and Written Opinion, PCT Application No. PCT/US08/55389, dated Jul. 25, 2008, seven pages.
PCT International Search Report and Written Opinion, PCT Application No. PCT/US2005/044729, dated May 14, 2007, twelve pages.
PCT International Search Report and Written Opinion, PCT Application No. PCT/US2007/003544, dated Jun. 16, 2008, ten pages.
PCT International Search Report and Written Opinion, PCT Application No. PCT/US2008/054631, dated Aug. 18, 2008, twelve pages.
PCT International Search Report and Written Opinion, PCT Application No. PCT/US2008/068435, dated Oct. 31, 2008, eleven pages.
PCT International Search Report and Written Opinion, PCT Application No. PCT/US2008/080347, dated Dec. 10, 2008, six pages.
PCT International Search Report and Written Opinion, PCT Application No. PCT/US2009/035193, dated Apr. 22, 2009, eleven pages.
PCT International Search Report and Written Opinion, PCT Application No. PCT/US2009/047250, dated Sep. 25, 2009, twelve pages.
PCT International Search Report and Written Opinion, PCT Application No. PCT/US2011/028231, dated May 19, 2011, nine pages.
Pearl, J., "Probabilistic Reasoning in Intelligent Systems: Networks of Plausible Inference," 1988, pp. 143-223, Morgan Kaufmann Publishers, Inc.
Pilka, F. et al., "Multi-step Ahead Prediction Using Neural Networks," 53'd International Symposium ELMAR—2011, Sep. 14-16, 2011, pp. 269-272, Zadar, Croatia.
Poppel, E., "A Hierarchical Model of Temporal Perception," Trends in Cognitive Sciences, May 1997, pp. 56-61, vol. 1, No. 2.
Poritz, A., "Linear Predictive Hidden Markov Models and the Speech Signal," IEEE, 1982, pp. 1291-1294.
"Problem Solving with HTMs," Numenta®, Jun. 2008, Numenta HTM Workshop, Jun. 23-24, 2008, SRI Campus, Menlo Park, CA, 23 pages.
Rachkovskij, "Representation and Processing of Structures with Binary Sparse Distributed Codes," IEEE Transactions on Knowledge and Data Engineering, Mar./Apr. 2011, pp. 261-276, vol. 13, No. 2.
Rao, R. et al., "Predictive Coding in the Visual Cortex: A Functional Interpretation of Some Extra-classical Receptive-field Effects," Nature Neuroscience, Jan. 1999, pp. 79-87, vol. 2, No. 1.
Riesenhuber, M. et al., "Hierarchical Models of Object Recognition in Cortex," Nature Neuroscience, Nov. 1999, pp. 1019-1025, vol. 2, No. 11.
Rinkus, "Hierarchical Sparse Distributed Representation of Sequence Recall and Recognition," Volen Center for Complex Systems, 2006, 49 pages.
Robinson, D. et al., "Spoken Language Identification with Hierarchical Temporal Memories," 2009 CS229 Course on Machine Learning at Stanford University, Dec. 11, 2009, five pages. [Online] [Retrieved Sep. 19, 2013] Retrieved from the Internet <URL: http://cs229 .Stanford .ed u/proj2009/F alcoLeu nq Robinson.pdf. >.
Rojas, R., "Neural Networks, A Systematic Approach," Springer-Verlag, 1996, pp. 20-21, 110-112, and 311-319.
Rolls, E., "Neurophysiological Mechanisms Underlying Face Processing within and Beyond the Temporal Cortical Visual Areas," Philosophical Transactions of the Royal Society of London. Series B, Biological Sciences, 335(1273), 1992, pp. 11-21.
Ross, L., "Discovering and Using Patterns in Plant Floor Data," Numenta HTM Workshop, Jun. 23-24, 2008, SRI Campus, Menlo Park, CA, twelve pages.
Rust, N., et al., "Selectivity and tolerance ("invariance") both increase as visual information propagates from cortical area V4 to IT,". The journal of Neuroscience: The Official journal of the Society for Neuroscience, 30(39), 2010, pp. 12978-12995.
Saphir, B. "Numenta Web Services," Numenta HTM Workshop, 2009, twenty pages.
Saphir, B., "Power NuPIC Part II, How to Create a New Node Type," Numenta, Jun. 2008, Numenta HTM Workshop, Jun. 23-24, 2008, SRI Campus, Menlo Park, CA, thirty-two pages.
sdsystem24.com, "HTM Optimized Drug Therapy," Numenta HTM Workshop, Jun. 23-24, 2008, SRI Campus, Menlo Park, CA, seven pages.
Sinha, P. et al., "Recovering Reflectance and Illumination in a World of Painted Polyhedra," Fourth International Conference on Computer Vision, Berlin, May 11-14, 1993, pp. 156-163, IEEE Computer Society Press, Los Alamitos, CA.
Spence, C. et al., "Varying Complexity in Tree-Structured Image Distribution Models," IEEE Transactions on Image Processing, Feb. 2006, pp. 319-330, vol. 15, No. 2.
Starzyk, J.A. et al., "Spatio-Temporal Memories for Machine Learning: A Long-Term Memory Organization," IEEE Transactions on Neural Networks, May 2009, pp. 768-780, vol. 20, No. 5.
Stringer, S.M. et al., "Invariant Object Recognition in the Visual System with Novel Views of 3D Objects," Neural Computation, Nov. 2002, pp. 2585-2596, vol. 14, No. 11.
Sudderth, E.B. et al., "Nonparametric Belief Propagation and Facial Appearance Estimation," AI Memo 2002-020, Dec. 2002, Artificial

(56) References Cited

OTHER PUBLICATIONS

Intelligence Laboratory, Massachusetts Institute of Technology, Cambridge, MA, USA, eleven pages.
Thomson, A., et al., "Functional maps of neocortical local circuitry," Frontiers in Neuroscience, 1 (1 ), 2007 pp. 19-42.
Thomson, A.M. et al., "Interlaminar Connections in the Neocortex," Cerebral Cortex, 2003, pp. 5-14, vol. 13, No. 1.
Thornton, J. et al., "Robust Character Recognition Using a Hierarchical Bayesian Network," Proceedings of the 19th Australian Joint Conference on Artifical Intelligence, 2006, pp. 1259-1264.
Todorovis, D., "Gestalt Principles," Scholarpedia, 3(12), 2008, pp. 5345.
Tsinarakis, G.J. et al. "Modular Petri Net Based Modeling, Analysis and Synthesis of Dedicated Production Systems," Proceedings of the 2003 IEEE International Conference on Robotics and Automation, Sep. 14-19, 2003, pp. 3559-3564, Taipei, Taiwan.
Tsinarakis, G.J. et al. "Modular Petri Net Based Modeling, Analysis, Synthesis and Performance Evaluation of Random Topology Dedicated Production Systems," Journal of Intelligent Manufacturing, 2005, vol. 16, pp. 67-92.
Tsukada, M, "A Theoretical Model of the Hippocampal-Cortical Memory System Motivated by Physiological Functions in the Hippocampus", Proceedings of the 1993 International Joint Conference on Neural Networks, Oct. 25, 1993, pp. 1120-1123, vol. 2.
U.S. Office Action, U.S. Appl. No. 11/010,243, dated Jul. 12, 2007, twelve pages.
U.S. Office Action, U.S. Appl. No. 11/147,069, dated Jan. 9, 2007, twenty-seven pages.
U.S. Office Action, U.S. Appl. No. 11/147,069, dated Jan. 9, 2009, thirty-eight pages.
U.S. Office Action, U.S. Appl. No. 11/147,069, dated Jul. 29, 2009, forty-three pages.
U.S. Office Action, U.S. Appl. No. 11/147,069, dated May 15, 2008, thirty-seven pages.
U.S. Office Action, U.S. Appl. No. 11/147,069, dated May 29, 2007, thirty-six pages.
U.S. Office Action, U.S. Appl. No. 11/147,069, dated Oct. 30, 2007, thirty-four pages.
U.S. Office Action, U.S. Appl. No. 11/351,437, dated Aug. 23, 2007, sixteen pages.
U.S. Office Action, U.S. Appl. No. 11/351,437, dated Feb. 20, 2008, six pages.
U.S. Office Action, U.S. Appl. No. 11/622,447, dated May 28, 2008, eighteen pages.
U.S. Office Action, U.S. Appl. No. 11/622,448, dated Apr. 30, 2008, seventeen pages.
U.S. Office Action, U.S. Appl. No. 11/622,448, dated Aug. 24, 2007, nineteen pages.
U.S. Office Action, U.S. Appl. No. 11/622,454, dated Jun. 3, 2008, thirteen pages.
U.S. Office Action, U.S. Appl. No. 11/622,454, dated Mar. 30, 2009, eleven pages.
U.S. Office Action, U.S. Appl. No. 11/622,455, dated Apr. 21, 2010, twelve pages.
U.S. Office Action, U.S. Appl. No. 11/622,456, dated Mar. 20, 2009, nine pages.
U.S. Office Action, U.S. Appl. No. 11/622,456, dated May 7, 2008, fourteen pages.
U.S. Office Action, U.S. Appl. No. 11/622,456, dated Nov. 6, 2008, seven pages.
U.S. Office Action, U.S. Appl. No. 11/622,457, dated Apr. 21, 2009, six pages.
U.S. Office Action, U.S. Appl. No. 11/622,457, dated Aug. 24, 2007, ten pages.
U.S. Office Action, U.S. Appl. No. 11/622,457, dated May 6, 2008, fourteen pages.
U.S. Office Action, U.S. Appl. No. 11/622,457, dated Nov. 20, 2008, eight pages.
U.S. Office Action, U.S. Appl. No. 11/622,458, dated Apr. 1, 2010, sixteen pages.
U.S. Office Action, U.S. Appl. No. 11/680,197, dated Mar. 23, 2010, twelve pages.
U.S. Office Action, U.S. Appl. No. 11/680,197, dated Sep. 14, 2010, seventeen pages.
U.S. Office Action, U.S. Appl. No. 11/713,157, dated Mar. 31, 2010, fourteen pages.
U.S. Office Action, U.S. Appl. No. 11/945,919, dated Sep. 7, 2010, nineteen pages.
U.S. Office Action, U.S. Appl. No. 12/029,434, dated Mar. 28, 2011, twenty-four pages.
U.S. Office Action, U.S. Appl. No. 12/029,434, dated Nov. 8, 2011, thirty-six pages.
U.S. Office Action, U.S. Appl. No. 12/039,630, dated Nov. 24, 2010, ten pages.
U.S. Office Action, U.S. Appl. No. 12/039,652, dated Mar. 29, 2011, fifteen pages.
U.S. Office Action, U.S. Appl. No. 12/040,849, dated Feb. 3, 2011, thirteen pages.
U.S. Office Action, U.S. Appl. No. 12/040,849, dated Jul. 1, 2011, eighteen pages.
U.S. Office Action, U.S. Appl. No. 12/147,348, dated Oct. 11, 2011, forty-three pages.
U.S. Office Action, U.S. Appl. No. 12/288,185, dated Sep. 15, 2010, eleven pages.
U.S. Office Action, U.S. Appl. No. 12/483,642, dated Apr. 26, 2012, twelve pages.
U.S. Office Action, U.S. Appl. No. 12/483,642, dated Aug. 10, 2012, seven pages.
U.S. Office Action, U.S. Appl. No. 12/751,808, dated Oct. 28, 2010, thirteen pages.
U.S. Office Action, U.S. Appl. No. 13/151,928, dated Aug. 2, 2011, eight pages.
U.S. Office Action, U.S. Appl. No. 13/218, 170, dated Jul. 5, 2013, six pages.
U.S. Office Action, U.S. Appl. No. 13/218,194, dated Oct. 5, 2012, fourteen pages.
U.S. Office Action, U.S. Appl. No. 13/227,355, dated May 25, 2012, twenty-four pages.
U.S. Office Action, U.S. Appl. No. 13/333,865, dated May 16, 2012, twenty-four pages.
U.S. Office Action, U.S. Appl. No. 13/218,202, dated Feb. 3, 2014, eleven pages.
U.S. Office Action, U.S. Appl. No. 13/658,200, dated May 8, 2015, seventeen pages.
Van Essen, D.C. et al., "Information Processing Strategies and Pathways in the Primate Visual System," An Introduction to Neural and Electronic Networks, 1995, pp. 45-76.
Vaught, T.N., "Software Design in Scientific Computing," Jun. 23, 2008, Numenta HTM Workshop, Jun. 23-24, 2008, SRI Campus, Menlo Park, CA, thirty-two pages.
"Vision Framework," Numenta®, Jun. 2008, Numenta HTM Workshop, Jun. 23-24, 2008, SRI Campus, Menlo Park, CA 36 pages.
Vlajic, "Vector Quantization of Images Using Modified Adaptive Resonance Algorithm for Hierarchical Clustering," IEEE Transactions on Neural Networks, 2001, pp. 1147-1162, vol. 12, No. 5.
Weiss, R. et al., "HyPursuit: A Hierarchical Network Search Engine that Exploits Content-Link Hypertext Clustering," Proceedings of the Seventh Annual ACM Conference on Hypertext, Mar. 16-20, 1996, pp. 180-193, Washington, D.C., USA.
Wiskott, L. et al., "Slow Feature Analysis: Unsupervised Learning of Invariances," Neural Computation, 2002, pp. 715-770, vol. 14, No. 4.
Wu, G. et al., "Multi-camera Spatio-temporal Fusion and Biased Sequence-data Learning for Security Surveillance," Association for Computing Machinery, 2003, pp. 528-538.
Wurtz, R., "Corollary Discharge in Primate Vision," Scholarpedia, 8(10), 2013, pp. 12335.
Yedidia, J.S. et al., "Understanding Belief Propagation and its Generalizations," Joint Conference on Artificial Intelligence (IJCAI 2001), Aug. 4-10, 2001, Seattle, WA, USA, thirty-five pages.
Zemel, R.S., "Cortical Belief Networks," Computational Models for Neuroscience, 2003, pp. 267-287, Hecht-Nielsen, R. et al., eds., Springer-Verlag, New York.

(56) References Cited

OTHER PUBLICATIONS

Zhang, R. et al., "Bayesian methodology for reliability model acceptance," Reliability Engineering & System Safety, 2003, pp. 95-103, vol. 80.
United States Office Action, U.S. Appl. No. 14/662,063, dated Oct. 2, 2018, eight pages.
United States Office Action, U.S. Appl. No. 14/662,063, dated Jan. 9, 2018, seven pages.
United States Office Action, U.S. Appl. No. 14/662,063, dated Jul. 27, 2017, 11 pages.

* cited by examiner

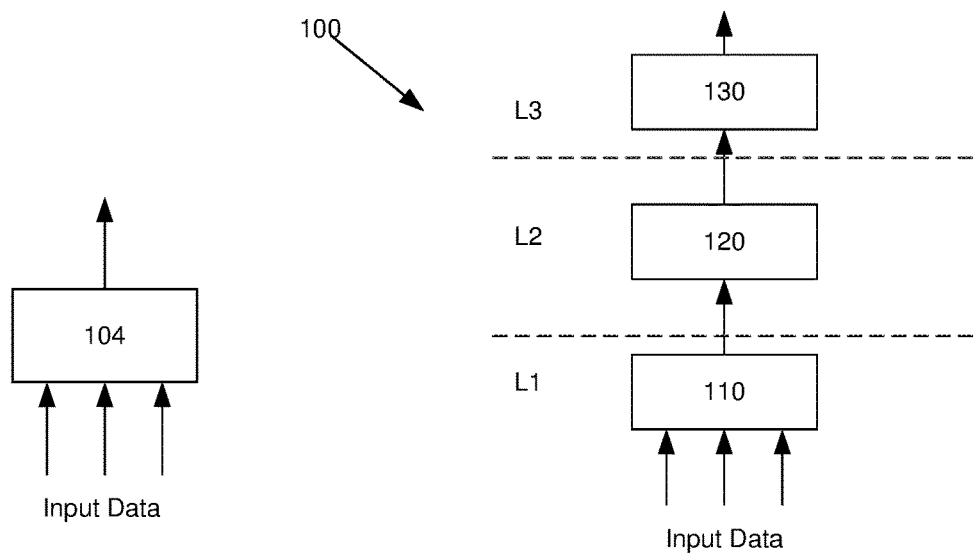
FIG. 1A
FIG. 1B
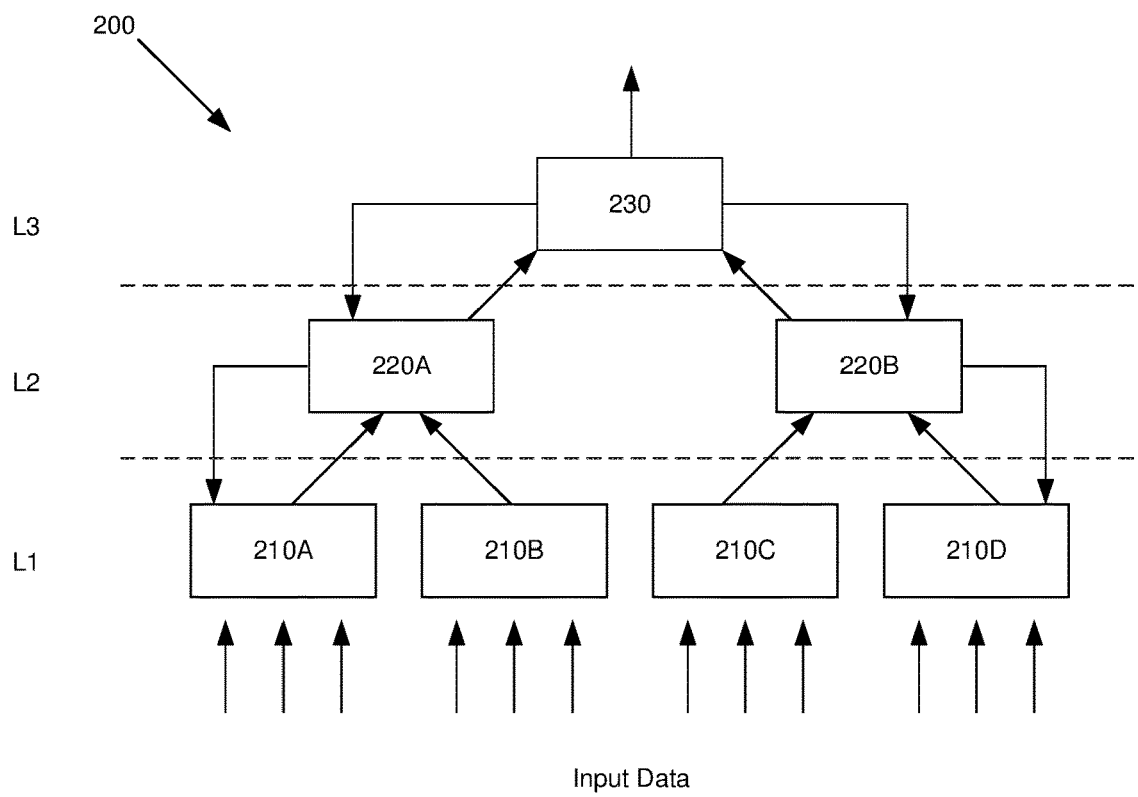
FIG. 2A

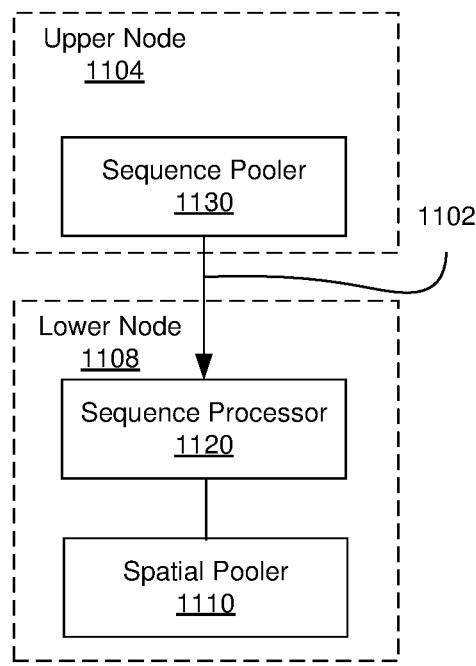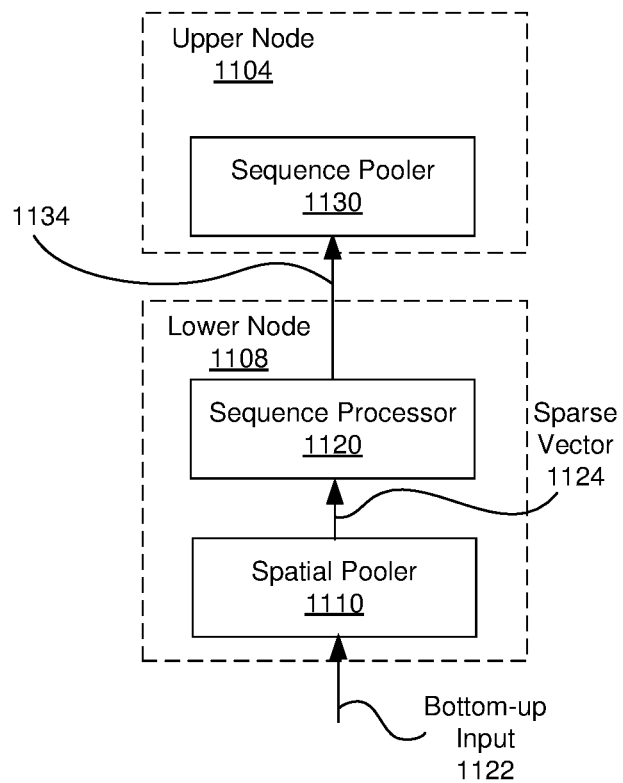
FIG. 11A
FIG. 11B

TEMPORAL PROCESSING SCHEME AND SENSORIMOTOR INFORMATION PROCESSING

CROSS-REFERENCE TO RELATED APPLICATIONS

This application is a continuation application of U.S. patent application Ser. No. 14/662,063, filed on Mar. 18, 2015, which claims priority under 35 U.S.C. § 119(e) to U.S. Provisional Patent Application No. 61/955,391 filed on Mar. 19, 2014 and U.S. Provisional Patent Application No. 62/106,620 filed on Jan. 22, 2015, all of which are incorporated by reference herein in their entirety.

BACKGROUND

1. Field of the Disclosure

The present disclosure relates to learning and processing spatial patterns and temporal sequences in a temporal memory system.

2. Description of the Related Arts

Hierarchical Temporal Memory (HTM) systems represent a new approach to machine intelligence. In an HTM system, training data including temporal sequences and/or spatial patterns are presented to a network of nodes. The HTM network then builds a model of the statistical structure inherent to the spatial patterns and temporal sequences in the training data, and thereby learns the underlying 'causes' of the temporal sequences of patterns and sequences in the training data. The hierarchical structures of the HTM system enables modeling of very high dimensional input spaces using reasonable amounts of memory and processing capacity.

The training process of the HTM system is largely a form of unsupervised machine learning. During a training process, one or more processing nodes of the HTM system form relationships between temporal sequences and/or spatial patterns present in training input and their associated causes or events. During the learning process, indexes indicative of the cause of events corresponding to the training input may be presented to the HTM system to allow the HTM system to associate particular categories, causes, or events with the training input.

Once an HTM system has built a model of a particular input space, it can perform inference or prediction. To perform inference or prediction, a novel input including temporal sequences or spatial patterns is presented to the HTM system. During the inference stage, each node in the HTM system produces an output that can be more invariant and temporally stable than its input. In other words, the output from a node in the HTM system is more abstract and invariant compared to its input. At its highest node, the HTM system will generate an output indicative of the underlying cause or event associated with the novel input.

SUMMARY

Embodiments relate to processing at a processing node an input data having a temporal sequence of spatial patterns by making predictions of the spatial patterns and generating output vectors having elements that are maintained active for a longer period of time if the spatial patterns associate with the elements were accurately predicted to become active. In contrast, elements of the output vectors associated with spatial patterns that were not previously predicted to become active but were nevertheless activated remain active for a shorter period of time.

In one embodiment, cells are employed in the processing node to represent temporal relationships between the spatial patterns. After a cell becomes active, the cell forms connections to a subset of other cells in the processing node that are active at a time when the cell becomes active. If a cell became active after being predicted for its activation, the cell remains active for a longer time, and therefore, causes more cells to form connections to the activate cell.

BRIEF DESCRIPTION OF THE DRAWINGS

The teachings of the embodiments can be readily understood by considering the following detailed description in conjunction with the accompanying drawings.

FIG. 1A is a conceptual diagram of a single processing node in a non-hierarchical system, according to one embodiment.

FIG. 1B is a conceptual diagram illustrating an hierarchical temporal memory (HTM) system including three layers of processing nodes, according to one embodiment.

FIG. 2A is a conceptual diagram illustrating an HTM system with multiple processing nodes at lower levels, according to one embodiment.

FIG. 11A is a schematic diagram illustrating sending of a feedback signal from an upper node as part of an unpooling process to place cells of a lower node in predictive states, according to one embodiment.

FIG. 11B is a schematic diagram illustrating operation of processing nodes after placing cells of sequence processor in predictive states, according to one embodiment.

DETAILED DESCRIPTION OF EMBODIMENTS

Figure 2B:
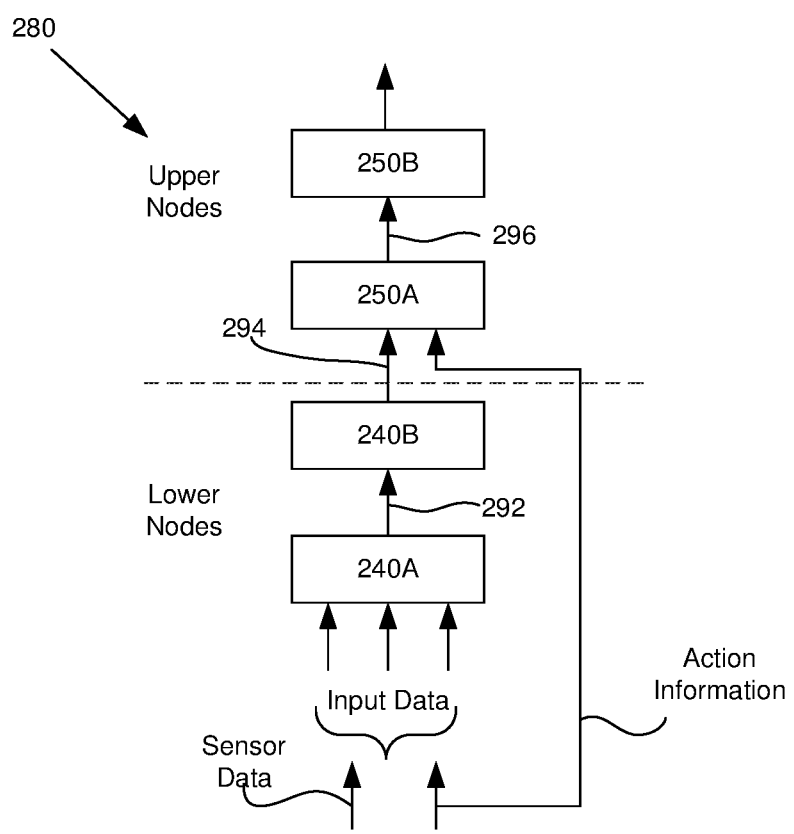
FIG. 2B is a conceptual diagram illustrating an HTM system receiving action information and sensor data as input data, according to one embodiment.

In the following description of embodiments, numerous specific details are set forth in order to provide more thorough understanding. However, note that the present invention may be practiced without one or more of these specific details. In other instances, well-known features have not been described in detail to avoid unnecessarily complicating the description.

A preferred embodiment is now described with reference to the figures where like reference numbers indicate identical or functionally similar elements. Also in the figures, the left most digits of each reference number corresponds to the figure in which the reference number is first used.

Certain aspects of the embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The language used in the specification has been principally selected for readability and instructional purposes, and may not have been selected to delineate or circumscribe the inventive subject matter. Accordingly, the disclosure set forth herein is intended to be illustrative, but not limiting, of the scope, which is set forth in the claims.

Embodiments relate to a processing node in a temporal memory system that performs temporal processing by activating cells where the activation of a cell is maintained longer if the activation of the cell were previously predicted or activation of more than a certain portion of associated cells was correctly predicted. An active cell correctly predicted to be activated or an active cell having connections to lower node active cells that were correctly predicted to become active contribute to accurate prediction, and hence, is maintained longer than cells activated but were not previously predicted to become active. Embodiments also relate to a temporal memory system for detecting, learning, and predicting spatial patterns and temporal sequences in input data by using action information.

Action information herein refers to information associated with actions taken on a logical or physical entity where the actions are known to cause changes in the sensor data. The logical or physical entity is external to a temporal memory system. The action information may, for example, indicate movement of a sensor (e.g. a camera), movement of a robotic arm or vehicle, setting of a target parameter (e.g., temperature) that can be sensed by a sensor (e.g., thermostat), or transactions (e.g., sell or buy) taken on a stock or commodities market.

Architecture of Temporal Memory System

A temporal memory system stores temporal relationships in sequences of spatial patterns and generates useful information based on the stored relationships. The useful information may include, for example, prediction of spatial patterns to be received, identification of spatial patterns, or a higher level cause associated with the spatial patterns in input data. The temporal memory system may be of a non-hierarchical structure or be of a hierarchical structure.

FIG. 1A is a conceptual diagram of a single processing node 104 in a non-hierarchical system. The processing node 104 receives input data, processes temporal sequences in the input data and generates an output. The output of the processing node 104 is based on the temporal relationships between spatial patterns. For example, the output may indicate prediction on what spatial patterns are to follow or indicate how well the prediction matched a subsequent spatial pattern in the input data.

FIG. 1B is a conceptual diagram of processing nodes organized in a hierarchical manner. Such a hierarchically structured temporal memory system is referred to as a Hierarchical Temporal Memory (HTM) system. In an HTM system, multiple processing nodes learn, predict, and infer input at different levels of abstraction. An example HTM system 100 of FIG. 1B comprises three levels where each level L1, L2, and L3 includes one processing node 110, 120, and 130, respectively. HTM system 100 has three levels L1, L2, L3, with level L1 being the lowest level, level L3 being the highest level, and level L2 being an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

The HTM system 100 has three levels L1, L2, and L3, where level L1 is the lowest level, level is L3 is the highest level, and level L2 is an intermediate level between levels L1 and L3. Processing node 110 at the lowest level L1 receives a sensed input that changes over time. Processing node 110 processes the sensed input and outputs a signal that is fed to its parent node 120 at level L2. Processing node 120 at level L2 in turn processes the signal from processing node 120 and outputs a signal to processing node 130 at the highest level L3. Processing node 120 outputs a signal that represents likely causes or events associated with the input data.

Each processing node 110, 120, 130 may perform spatial pooling and/or temporal processing, as described below in detail with reference to FIG. 4. As a result, the output signals from each processing node 110, 120, 130 are more abstract or invariant over time compared to their input signals. In one embodiment, the top node 130 generates a final output of HTM system 100 that is of the highest abstraction (e.g., likely causes or events) among the outputs generated in HTM system 100. The final output may include distributions indicating likelihood that certain causes or events are associated with the sensed input.

Some of the functions performed by a processing node include, for example, spatial pooling and temporal processing. Spatial pooling herein refers to the process of mapping a set of distinct but similar spatial patterns into a spatial co-occurrence. Temporal processing may include, but is not limited to, learning temporal sequences, performing inference, recognizing temporal sequences, predicting temporal sequences, labeling temporal sequences, and temporal pooling. Learning temporal sequences herein refers to one or more of initializing, expanding, contracting, merging, and splitting temporal sequences. Predicting temporal sequences herein refers to assessing the likelihood that certain spatial patterns will appear subsequently in the input data. Temporal pooling herein refers to processing input data to provide an output that is more stable and invariable over time compared to spatial patterns in the input data. Hardware, software, firmware, or a combination thereof for performing spatial pooling is hereinafter referred to as a spatial pooler. Hardware, software, firmware or a combination thereof for performing the temporal processing is hereinafter referred to as a sequence processor. The sequence processor may perform one or more of learning temporal sequences, performing inference, recognizing temporal sequences, predicting temporal sequences, labeling temporal sequences and temporal pooling.

In one embodiment, a processing node includes only a sequence processor or the spatial pooler. For example, nodes at the first level of the HTM system may consist of processing nodes having only spatial poolers, and the nodes at the second level of the HTM system may consist of processing nodes having only sequence processors. Processing nodes performing other functions (e.g., filtering) may also be placed within the HTM system. Alternatively, a processing node may include two or more levels of interconnected sequence processors or spatial poolers.

The processing nodes of the HTM system may be arranged so that the number of processing nodes decreases as level increases. FIG. 2A is a diagram illustrating HTM system 200 having three levels L1, L2, and L3, where level L1 is the lowest level, level L3 is the highest level, and level L2 is an intermediate level between levels L1 and L3. HTM system 200 is hierarchically structured so that the processing nodes cover a larger input space as the level ascends. Level L1 has nodes 210A, 210B, 210C, and 210D; level L2 has nodes 220A and 220B; and level L3 has node 230. Nodes 210A, 210B, 210C, 210D, 220A, 220B, and 230 are hierarchically connected in a tree-like structure such that each processing node has several children nodes (that is, nodes connected at a lower level) and one parent node (that is, node connected at a higher level).

Further, HTM system 200 propagates bottom-up signals up the hierarchy and propagates top-down signals down the hierarchy. That is, each processing node 210A, 210B, 210C, 210D, 220A, 220B, and 230 may be arranged (i) to propagate information up the HTM hierarchy to a connected parent node, and (ii) to propagate information down the HTM hierarchy to any connected children nodes.

The number of levels and arrangement of processing modes in FIGS. 1 and 2 are merely illustrative. Many variants of an HTM system may be developed and deployed depending on the specific application. For example, the number of levels may be increased to provide different levels of abstraction/invariance or to accommodate different types of sensed inputs (e.g., visual data and audio data). Further, a parent node may also receive partially overlapping bottom-up signals from multiple children nodes. An external supervision signal may also be fed to each of the processing nodes to enhance spatial and/or temporal processing performance.

In one embodiment, one or more nodes of the temporal memory system receives sensed inputs representing images, videos, audio signals, sensor signals, data related to network traffic, financial transaction data, communication signals (e.g., emails, text messages and instant messages), documents, insurance records, biometric information, parameters for manufacturing process (e.g., semiconductor fabrication parameters), inventory counts, energy or power usage data, data representing genes, results of scientific experiments or parameters associated with operation of a machine (e.g., vehicle operation), or medical treatment data. The temporal memory system may process such inputs and produce an output representing, among others, identification of objects shown in an image, identification of recognized gestures, classification of digital images as pornographic or non-pornographic, identification of email messages as unsolicited bulk email ('spam') or legitimate email ('non-spam'), prediction of a trend in financial market, prediction of failures in a large-scale power system, identification of a speaker in an audio recording, classification of loan applicants as good or bad credit risks, identification of network traffic as malicious or benign, identification of a person appearing in the image, interpretation of meaning using natural language processing, prediction of a weather forecast, identification of patterns in a person's behavior, generation of control signals for machines (e.g., automatic vehicle navigation), determination of gene expression and protein interactions, determination of analytic information describing access to resources on a network, determination of parameters for optimizing a manufacturing process, prediction of inventory, prediction of energy usage in a building or facility, predictions of links or advertisement that users are likely to click, identification of anomalous patterns in insurance records, prediction of experiment results, indication of illness that a person is likely to experience, selection of contents that may be of interest to a user, prediction of a person's behavior (e.g., ticket purchase, no-show behavior), prediction of election results, prediction or detection of adverse events, identification of a string of text in an image, identification of a topic in text, and a prediction of a patient's reaction to medical treatments. The underlying representation (e.g., image, audio, video, text) can be stored in a non-transitory, computer-readable storage medium.

Temporal Memory Architecture for Processing Action Information

FIG. 2B is a conceptual diagram of processing nodes organized to receive sensor data and action information as input data, according to one embodiment. The sensor data indicates data generated from a sensor that detects logical or physical characteristics of physical or logical constructs. The sensor data may include, for example, pixel data generated by an image sensor (e.g., a camera), network load conditions in a network generated by network sensors, and surface topography data generated by tactile sensors. The action information indicates parameters associated with the operation of sensor such as a representation of the sensor's orientation and position or parameters associated with the movement of sensor such as direction and distance of movement.

An example HTM system 280 of FIG. 2B comprises four different processing nodes 240A, 240B, 250A and 250B. Processing nodes 240A and 240B form lower nodes and processing nodes 250A and 250B form upper nodes. Each of the processing nodes 240A, 240B, 250A, and 250B includes a spatial pooler and a sequence processor, as described below in detail with reference to FIG. 3. The lower nodes 240A, 240B may have the same number of cell columns. The cell columns are described below in detail with reference to FIG. 6. The upper nodes 250A, 250B may also have the same number of cell columns, that may be the same as or different from the number of cell columns in the lower nodes 240A, 240B.

The lowest node 240A receives both the sensor data and the action information as its input data. The lowest node 240A feeds a sparse vector indicating spatial patterns detected from the input data to the processing node 240B. Because the action information is included in its input data, the lowest node 240A learns, detects and predicts the changes in the sensor data in relation to sensor operation as represented by the motor information. The motor information may be correlated with the overall changes of the sensor data. By learning the relationship between the motor information and the sensor data, the lowest node 240A may generate an output 292 that can indicate changes in the sensor data not attributable to the motor information. Taking an example where captured image data is generated by a camera, the lowest node 240A may learn to distinguish changes in the sensor data due to the panning or tilting of the camera (i.e., the movement of the camera).

The processing node 240B receives the output 292 (for example, a vector in a sparse distributed representation) from the processing node 240A, and learns, detects and predicts changes in the output received from the processing node 240A. The processing node 240B generates processed data 292 and feeds it to processing node 250A. The processed data 292 from node 240B indicates changes that cannot be predicted by node 240A. These changes may represent, for example, the object moving relative to the camera. In one embodiment, node 240B learns high-order sequences and makes high-order predictions.

The processing node 250A receives processed data 294 from the processing node 240B and action information as its input data to learn, detect and predict the changes in its input data. The action information provided to the processing node 250A may be different from the action information provided to the processing node 240A. For example, the action information provided to the processing node 250A may represent a larger movement of a body attaching a sensor (e.g., a camera) while the action information provided to the processing node 240A may represent a smaller sensor movement (e.g., panning of a camera). The processed output 296 from the processing node 250A is again fed to the processing node 250B for further learning, detection and prediction. The processing node 250A may also receive input from other nodes of FIG. 2B or from other nodes in a separate hierarchy of nodes.

The architecture of FIG. 2B is advantageous because the spatial patterns and temporal sequences of sensor data relative to operational parameters of a sensor can be learned in an effective manner. There are two potential sources of changes in sensor data. One source of change is due to the sensors moving relative to the world. The second source of change is due to objects in the world changing or moving on their own. The architecture of FIG. 2B uses two predictive sequence memories to successively learn and process these two types of change. The two-stage mechanism is applicable to any type of sensory data.

Structure of Example Processing Node and Overall Process

Figure 3:
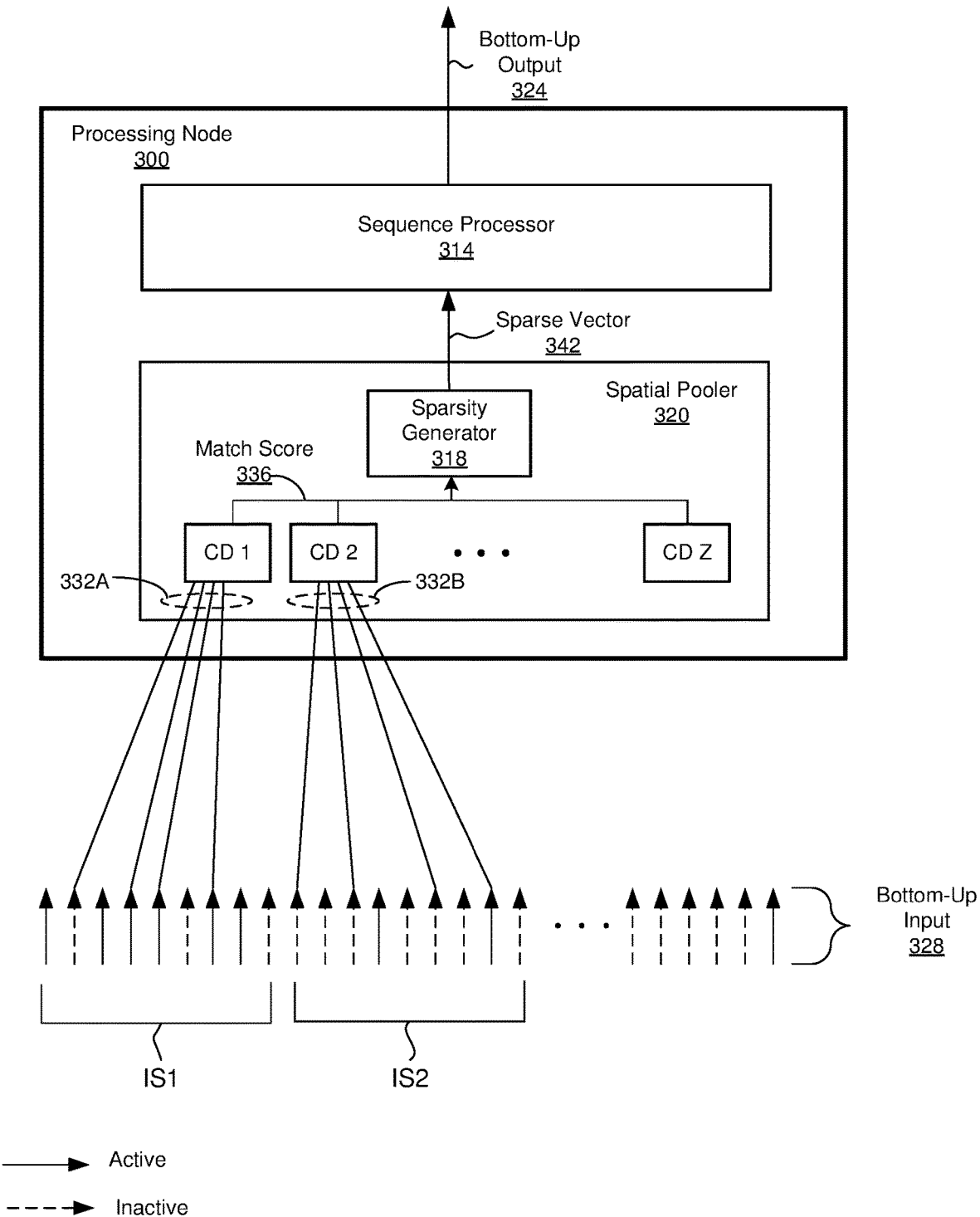
FIG. 3 is a block diagram illustrating a processing node of an HTM system, according to one embodiment.

FIG. 3 is a block diagram illustrating processing node 300 in a temporal memory system, according to one embodiment. The processing node 300 may be a stand-alone node for operating without other processing nodes. Alternatively, the processing node 300 may be part of a hierarchy of processing nodes, for example, as described above in detail with reference to FIGS. 1A through 2B. Particularly, the processing node 300 may be the lowest node 240A receiving sensor data and action data as its input, as illustrated in FIG. 2B whereas upper processing nodes are embodied using a different structure as described below in detail with reference to FIG. 10.

Processing node 300 may include, among other components, a sequence processor 314 and a spatial pooler 320. Spatial pooler 320 receives bottom-up input 328, performs spatial pooling, and sends sparse vector 342 in a sparse distributed representation to sequence processor 314. The sparse vector 342 includes information about patterns detected in the bottom-up input 328. For a processing node 300 at the lowest level, the bottom-up input 328 may be sensed input. For processing nodes at intermediate and top levels, the bottom-up input 328 may be a bottom-up output from a child node or children nodes. The spatial pooling is described below in detail with reference to FIG. 5. The processing nodes at different hierarchical levels may have a different structure, for example, as described below in detail with reference to FIG. 10.

Sequence processor 314 receives the sparse vector 342, performs temporal processing and generates the bottom-up output 324. The bottom-up output 324 represents information describing temporal sequences detected or predicted in the spatial patterns of the bottom-up input 328. Bottom-up output 324 is fed to a parent node, which may have a similar or the same structure as processing node 300.

Figure 4:
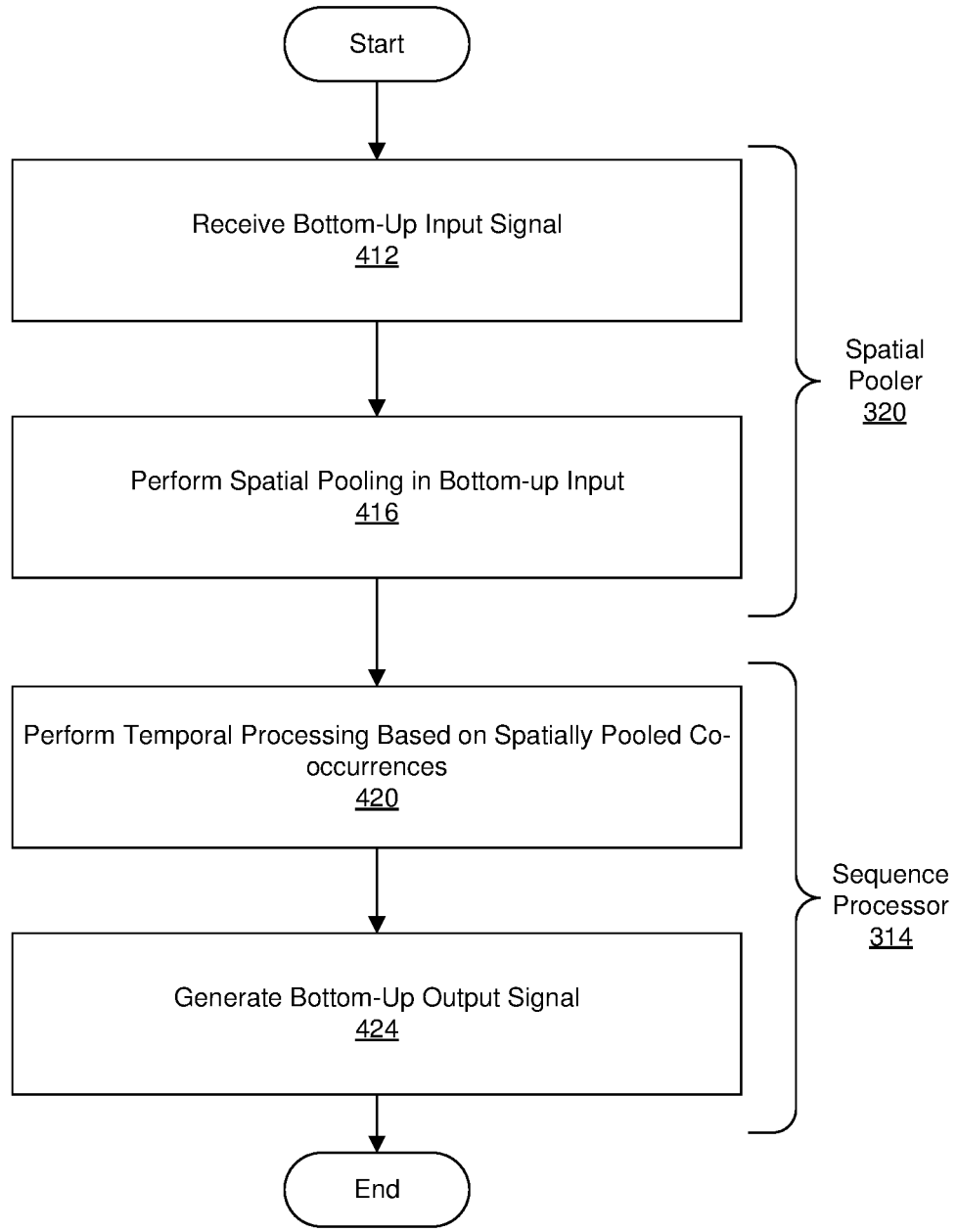
FIG. 4 is a flowchart illustrating an overall process in a processing node of an HTM system, according to one embodiment.

FIG. 4 is a flowchart illustrating an overall process at processing node 300, according to one embodiment. Spatial pooler 320 receives 412 bottom-up input 328. Then spatial pooler 320 performs 416 spatial pooling for co-occurrences detected in bottom-up input 328, as described below in detail with reference to FIG. 5A. As a result, spatial pooler 342 generates sparse vector 342 that is sent to sequence processor 314.

Sequence processor 314 receives sparse vector 342 and performs 420 temporal processing based on spatially pooled co-occurrences, as described below in detail with reference to FIG. 10. Sequence processor 314 then generates 424 bottom-up output 324 that is sent to a parent node.

The process described in FIG. 4 is merely illustrative. Various additional steps may be added, and certain steps may be omitted from the step depending on the structure and function of the processing nodes.

Spatial Pooling Using Local Inhibition

Spatial pooler 320 performs spatial pooling by producing the sparse vector 342 in the form of a sparse distributed representation. In a sparse distributed representation, a number of elements in the sparse vector 342 are inactive (e.g., assigned a value of zero) while the remaining elements are active (e.g., assigned a value of one). For example, sparse vector 342 may have approximately 10% of its elements active while approximately 90% of its elements are inactive. The percentage of active elements may be fixed (i.e., a fixed-sparsity representation) or the percentage of active elements may change over time.

Spatial pooling is the process of grouping similar spatial patterns and representing these spatial patterns using a single vector. Taking an example of processing input data for 100×100 input space (i.e., 10,000 elements), the total number of unique spatial patterns is $2^{10,000}$, assuming that each element of the input data is binary (i.e., zero or one).

Referring to FIG. 3, spatial pooler 320 includes, among other components, a sparsity generator 318 and a plurality of co-occurrence detectors (CDs) 1 through Z. CDs detect co-occurrences in bottom-up input 328, and generate match scores 336. Match scores 336 indicate the degree of match between a spatial pattern of the bottom-up input 328 and a co-occurrence pattern associated with each CD. In one embodiment, a higher match score indicates more overlap between bottom-up input 328 and the associated co-occurrence pattern of each CD. The match scores 336 are provided to the sparsity generator 318. In response, the sparsity generator 318 generates sparse vector 342 in the form of a sparse distributed representation.

In one embodiment, each CD is mapped to a subset of elements in the bottom-up input 328 within predefined input space. As illustrated in FIG. 3 by lines extending from CD 1 to a subset of arrows of bottom-up input 328, CD 1 is mapped to receive a subset 332A of elements of the bottom-up input 328 within input space IS1. Similarly, CD 2 is mapped to receive a subset of elements of the bottom-up input 328 within input space IS2. Although illustrated in FIG. 3 as one-dimensional for the sake of simplification, the input space (e.g., IS1, IS2) may consist of two or more dimensions.

The input space of each CD may be mutually exclusive or may partially overlap. Also, each CD may be mapped to receive the same number of input elements or a different number of input elements. Each input element could be binary or contain scalar values. In one embodiment, CDs are arranged to have topological relationships to their input space. For example, adjacent CDs cover adjacent portions of input space.

The sparsity generator 318 collects the match scores 336 from the CDs, selects a number of CDs satisfying conditions based on their match scores and match scores of nearby CDs to generate sparse vector 342. In one embodiment, when a CD becomes dominant (e.g., the CD has a high match score), the CD inhibits selection of other CDs within a predetermined range (hereinafter referred to as "an inhibition range"). The inhibition range may extend only to CDs immediately adjacent to the dominant CD or may extend to CDs that are separated from the dominant CD by a predetermined distance. Alternatively, sparsity generator 318 may select a subset of CDs with highest match scores among all CDs in the processing node 300.

In one embodiment, the inhibition range of processing nodes increases at a higher level of the HTM system compared to the inhibition range of processing nodes at a lower level of the HTM system. The inhibition ranges of the processing nodes may be set so that the densities of the sparse vectors in the processing nodes at different levels are the same or within a predetermined range. The processing nodes at a higher level cover a larger range of input space than the processing nodes at a lower level. Hence, in order to achieve the same level of density across different levels of processing nodes, the inhibition range for processing nodes may be increased as the level in the hierarchy increases.

In one embodiment, a greedy winner selection algorithm is used to select the dominant CD.

In an example of sparse vector 342, elements corresponding to the chosen CDs are indicated as being active, and elements corresponding to unselected CDs are indicated as being inactive. Assume that the spatial pooler includes 10 CDs of which the first CD and the fourth CD were selected for high match scores. In this example, the sparse vector may be (1, 0, 0, 1, 0, 0, 0, 0, 0, 0), where the first and fourth elements are active but other elements are inactive. The density of the spatial vector representing the ratio of selected CDs among all CDs is governed by the inhibition range and the selection threshold value (the density of sparse vector 342 increases as the as the percentage of selected CDs increases). As the inhibitory range of a dominant CD increases, the density of the sparse vector 342 decreases. Further, as the selection threshold value increases, the density of the sparse vector increases. Conversely, as the inhibitory range of a dominant CD decreases, the density of the sparse vector 342 increases. Also, as the selection threshold value decreases, the density of the sparse vector 342 decreases. The combination of inhibitory range and the selection threshold value maintains the density of sparse vector 342 within a certain range. Alternatively, a fixed number of CDs may be selected from all CDs based on the match scores (e.g., a certain number of CDs with highest match scores).

When a new spatial pattern is presented, the match scores from the CDs may be updated accordingly. The updated match scores may prompt changes in sparse vector 342. In one embodiment, sparsity generator 318 implements hysteresis by retaining a previously chosen CD in the top CDs until a competing CD has a match score exceeding the match score of the chosen CD by a threshold score (e.g., a match score 20% higher). In this way, the sparse vector becomes more stable over time and more robust to noise.

Figure 5:
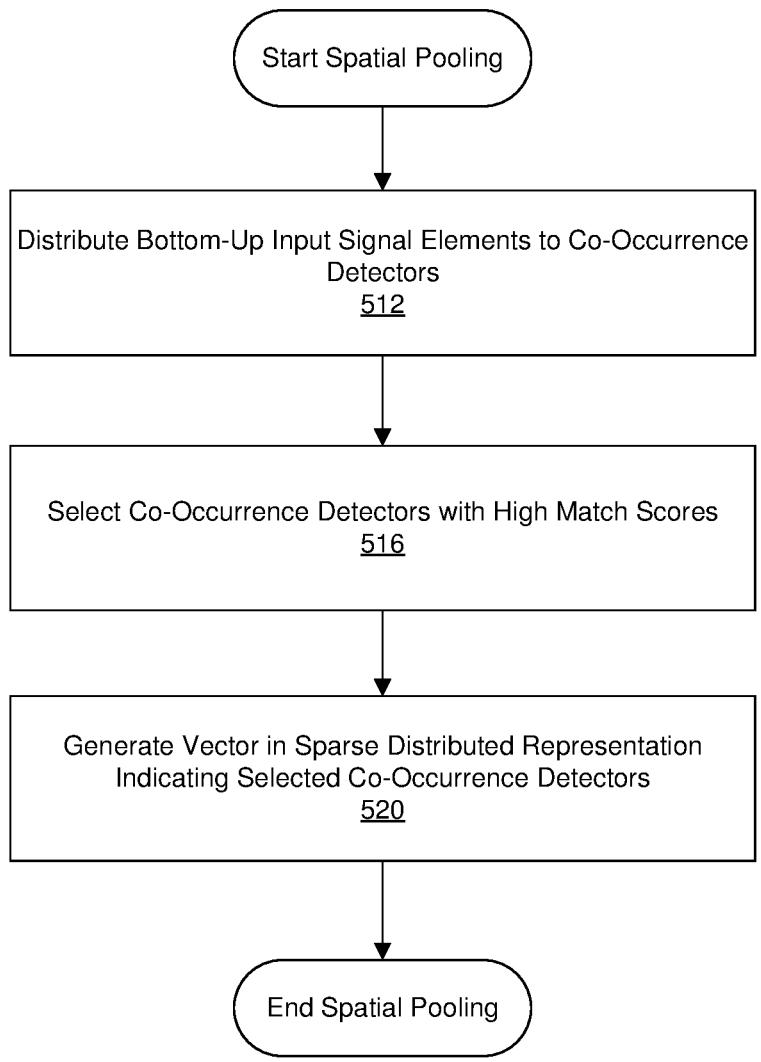
FIG. 5 is a flowchart illustrating a method of performing spatial pooling in a processing node, according to one embodiment.

FIG. 5 is a flowchart illustrating a method of performing spatial pooling in processing node 300, according to one embodiment. First, the elements of bottom-up input 328 are sent 512 to CDs according to the mappings between the input elements of the bottom-up input 328 and CDs.

Each CD then generates a match score indicating the extent to which a co-occurrence pattern associated with the CD matches the received input elements. Based on the match scores 336 from CDs, sparsity generator 318 selects 516 CDs that have high match scores 336. In selecting the CDs, local inhibition may be employed to partially or entirely exclude CDs within an inhibition range of a dominant CD. As a result of the selection, a subset of CDs is selected from the entire CDs (e.g., 50 CDs are selected from a total of 500 CDs). Sparsity generator 318 then generates 520 sparse vector 342 in the form of a sparse distributed representation to indicate the selected CDs.

Since each sparse vector may represent one or more spatial patterns, the spatial pooling achieves abstraction and generalization in spatial domain. A sparse vector 342 that changes over time is then provided to sequence processor 314 to perform abstraction and generalization in the temporal domain.

Temporal Processing in Sequence Processor

Temporal processing includes various time-based processing of spatial patterns such as recognizing, predicting, or labeling of temporal sequences. Sequence processor 314 learns and stores transitions between spatial patterns as represented by sparse vector 342. Based on the learned transitions, sequence processor 314 recognizes and predicts the same or similar transitions in a new input signal. Embodiments provide a temporal processing mechanism that takes advantage of the characteristics of sparse distributed representation vectors to learn, recognize, and predict temporal sequences of spatial patterns or parts of spatial patterns.

Sequence processor 314 may learn, store and detect temporal sequences of different lengths (also referred to as "variable order" temporal processing). The variable order temporal processing enables learning and detection of more temporal sequences and enhances prediction, inference, or other capabilities of the processing node.

Sequence processor 314 may also learn, store, and detect temporal sequences while performing inference, prediction or other temporal processing (also referred to as "online learning"). The online learning combines a learning (or training) phase and a temporal processing (e.g., predicting) phase into a single phase. By combining two distinct phases into a single phase, sequence processor 314 can process information in a more time-efficient manner.

In one embodiment, the sequence processor 314 receives a sparse vector 342 that remain constant until a next discrete time steps. A time step herein refers to a division of time for performing digital processing at the processing node 300.

During each time step, the sparse vector 342 is assumed to maintain a particular set of values. For instance, the sparsity generator 318 periodically samples the match score 336 to output a sparse vector 342 that may be updated after each time step. Alternatively or additionally, the bottom-up input 328 is converted into discrete values at discrete time steps, and the processing node 300 determines values at discrete time steps. Accordingly, the sequence processor 314 may learn, store, and detect temporal sequences of values that are updated over discrete time steps. Using discrete time steps is advantageous, among other reasons, because computational complexity is reduced.

Figure 6:
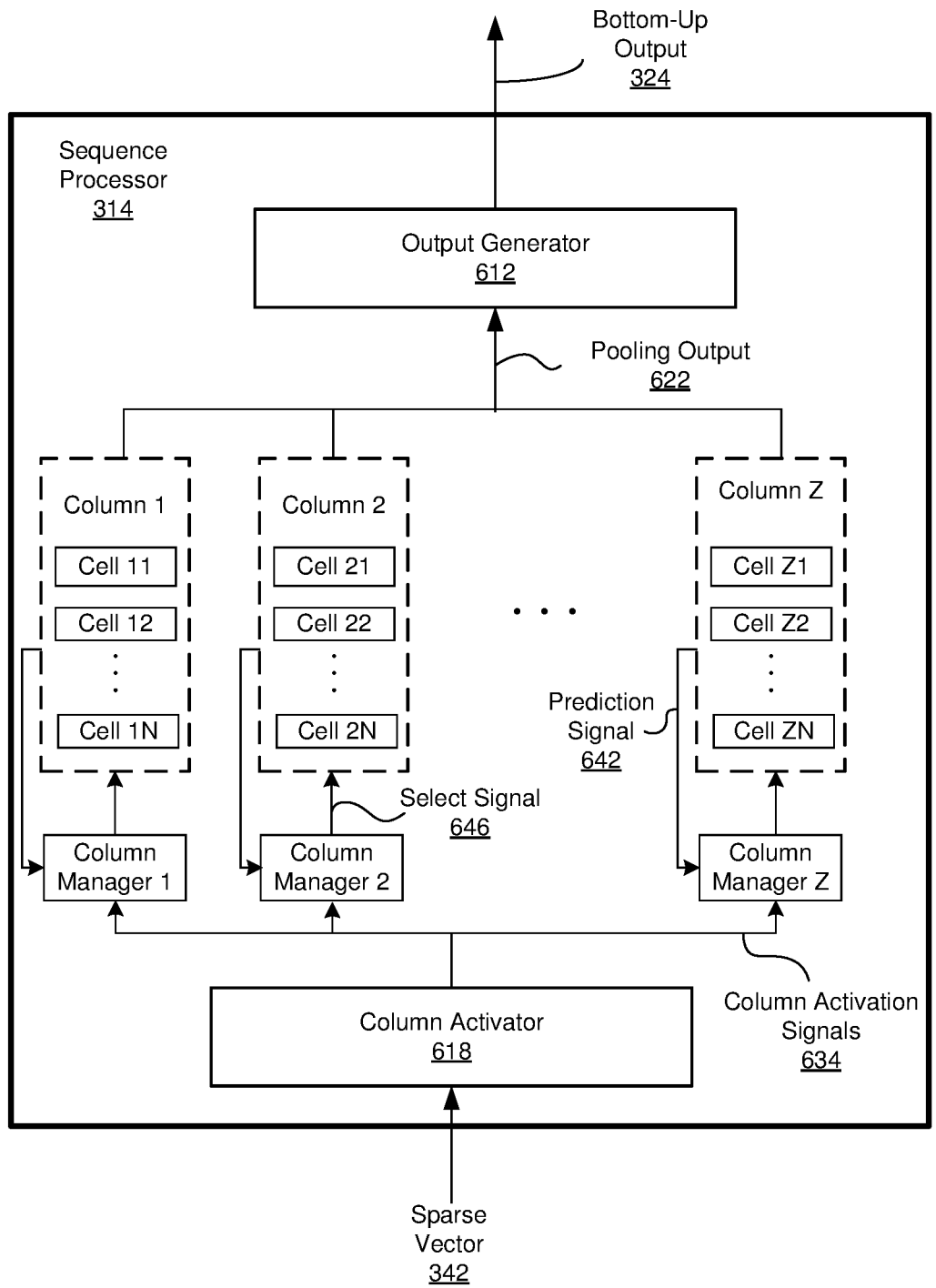
FIG. 6 is a block diagram illustrating a sequence processor in a processing node, according to one embodiment.

FIG. 6 is a block diagram illustrating sequence processor 314, according to one embodiment. Sequence processor 314 may include, among other components, output generator 612, columns of cells (in dashed boxes), column managers, and column activator 618. The column activator 618 receives sparse vector 342 from spatial pooler 320. In response, column activator 618 generates column activation signals 634 indicating which columns to be activated based on sparse vector 342.

The number of total columns may coincide with the total number of elements in sparse vector 342. The column activator 618 receives sparse vector 342 and determines which elements of sparse vector 342 are active. Then, column activator 618 sends column activation signals 634 to corresponding columns to activate these columns.

In one embodiment, each column includes the same number (N) of cells. A cell has three states: inactive, predictive, and active. A cell becomes activated (i.e., in an active state) in response to activation by the select signal 646. When a cell in a column becomes activated, the active cell inhibits activation of other cells in the same column except in certain limited circumstances. The predictive state represents a prediction that the cell will be activated by the select signal 646 at a next time step. A cell becomes predictive (i.e., in a predictive state) in response to current sequence outputs from other cells in the same processing node 300 or level. Alternatively or additionally, the cell becomes predictive due to any combination of inputs from other nodes, inputs from action information, and to sparse vector 342. For example, an input from a higher-level node represents context used to predict cell activation corresponding to behavior generated in response to the context. As another example, an input from a lower-level node represents a change in orientation or position of a sensor used to predict cell activation corresponding to recognition of a pattern from the sensor input. In some embodiments, a cell may simultaneously be activated and predictive. In some embodiments, a cell is either activated or predictive, and a cell having inputs meeting conditions to make the cell both active and predictive becomes active. A cell that is in neither an active state nor a predictive state is referred to as inactive (i.e., in an inactive state).

Each column is connected to an associated column manager. The column manager receives the column activation signal 634, determines activation states of cells in the column (based on prediction signal 642), and sends select signal 646 to activate one or more cells in the column under certain circumstances. The prediction signal 642 identifies which cells in the column are in a predictive state. In one embodiment, the column manager sends the select signal 646 to one or more cells in the column to activate those cells in response to the column activation signal 634.

In one embodiment, the column manager selects the cells to activate according to the prediction signal 642. For example, the column manager selects one or more of the cells in the column that are currently in a predictive state (as indicated by the prediction signal 642). Continuing the example, if the prediction signal 642 indicates that no cell in the column is currently in a predictive state, the column manager selects one or more of the cells (e.g., all of the cells in the column) to activate. When no cell in the column is currently in a predictive state, the column manager may select a cell in the column for activation based on how recently the cell was activated. Specifically, the cell most recently activated in the column may be selected for activation. If no prior activated cell exists, then the best matching cell or the least used cell may be chosen for activation.

In another embodiment, the column manager selects one or more cells in the column even though the prediction signal 642 indicates that other cells are in the predictive state. For example, the column manager may select the cell to learn the connections randomly or according to a predetermined list. The column manager sends the select signal 646 to activate the selected cells. The selected cells then learn a temporal sequence by making connections to active cells in other columns, as described below in detail with reference to FIGS. 7 and 8. The selected cells may also make connections to any combinations of active cells in other processing nodes (including processing nodes both in the same layer as the processing node 300 and in different layers from processing node 300), inputs from different levels and action information.

The cells individually, or collectively as a column, send pooling output 622 to output generator 612. The pooling output 622 identifies the state of the cells. For instance, the pooling output 622 indicates which cells are activated and/or which cells are predictive. In certain applications (e.g., flash inference), a column generates a pooling output 622 to indicate whether any of the cells in the column are activated. In such application, once any cell in the column is activated, the column sends a pooling output 622 indicating that the column is active. The pooling output may be represented as a binary value such as a two-bit binary value, with one bit indicating whether the cell is activated and one bit indicating whether the cell is predictive. Although the pooling output 622 takes a binary value in most cases, the pooling output 622 may also be a non-binary value. For example, the pooling output 622 may include an integer or real-number value indicating the strength of the cell's cell activated state or predictive state.

In one embodiment, output generator 612 collects the pooling outputs 622 from the cells or columns and concatenates these outputs into a vector. The concatenated vector may be sent as bottom-up output 324 of the sequence processor 314 to a parent processing node for further temporal processing and/or spatial pooling. Alternatively, the concatenated vector may be provided as an output of the temporal memory system or be further processed to identify a higher level cause of the input signal. The output generator 612 may also function as a buffer and synchronize signals from sibling processing nodes.

The bottom-up output 324 is also a vector in a sparse distributed representation. The percentage of active (or inactive) elements in the bottom-up output 324 may be any percentage, but the percentage is often less than approximately 10%.

In one embodiment, the output generator 612 collects the pooling outputs 622 and outputs an active cell (AC) vector (identifying activated cells) and a predicted active cell (PAC) vector identifying activated cells that were correctly predicted to become active. The output generator 612 identifies the predicted active cells by comparing a list of currently activated cells to a list of cells in the predictive state at a last time step before the current time step. The predicted cell vector includes those cells in common between the list of currently activated cells and the list of cells in the predictive state at the last time step. Because the predicted active cells are a subset of the activated cells (or include all the activated cells), the number of active elements in the first vector equals or exceeds the number of elements in the second vector.

Example Operation and Function of Cell in Sequence Processor

Sequence processor 314 performs temporal processing by selectively activating cells (and columns), and learning previous states of cell activations. As the learning at the cells progresses, the cells learn to anticipate spatial patterns in the bottom-up input 328 and correspondingly enter a predictive state before corresponding spatial patterns appear in bottom-up input 328, causing those cells to then transition to an activated state. When a cell transitions from a predictive state to an active state, the cell may remain in the active state for a time after the transition. As cells remains active for a longer time, the cells produce a more stable and invariant bottom-up output 314 to a parent node.

Figure 7:
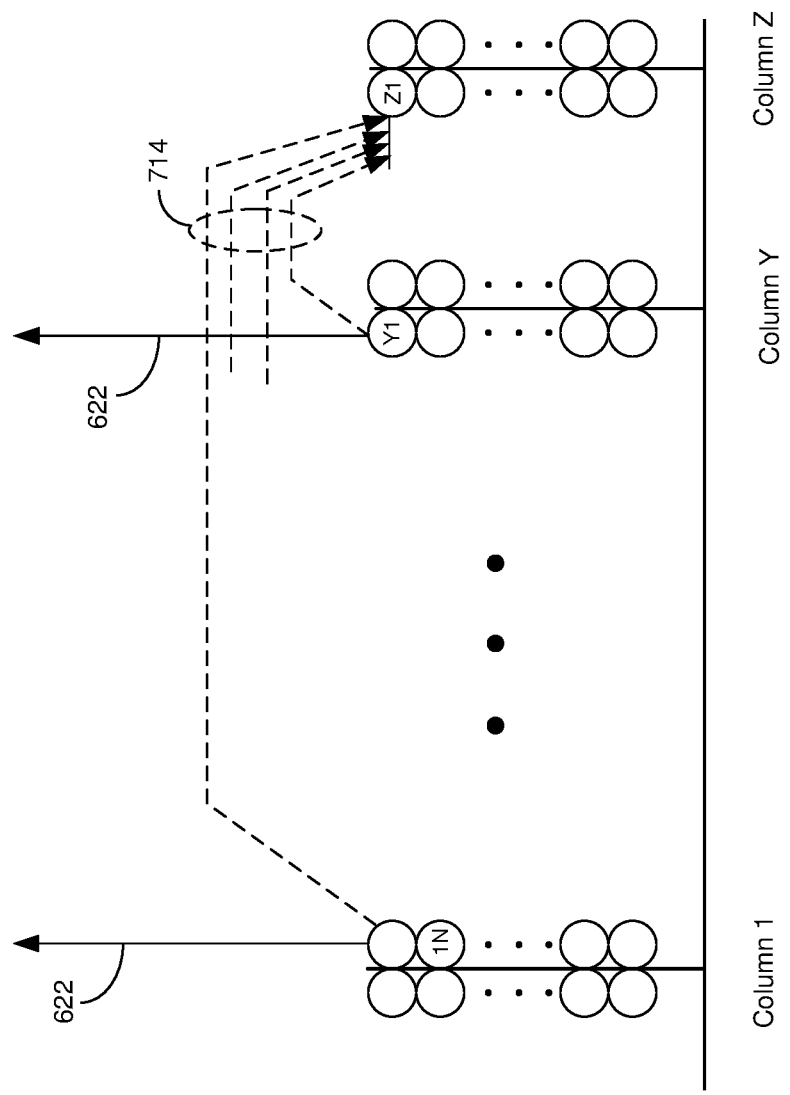
FIG. 7 is a conceptual diagram illustrating operation of columns of cells, according to one embodiment.

FIG. 7 is a diagram illustrating columns and output signals from the cells, according to one embodiment. Each circle in FIG. 7 represents a cell. When each cell becomes active, the cell sends out pooling output 622. An activated cell may also send out a sequence output 714 to other cells to indicate its activation state. A basic idea behind implementing temporal processing is to have a learning cell, upon activation, detect activation states of other cells and store the activation states in a "temporal memory segment." The stored activation states may be current activation states and/or previous activation states of other cells. A "temporal memory segment" herein refers to a data structure for storing the activation states of other cells.

In storing the activation states, the cell selects a subset of active cells and stores only the states of the selected cells. A large number of cells in a processing node 300 may be active at the same time. Therefore, a large memory space may be needed to store activation states of all activated cells in the processing node. To reduce the memory requirement, a small number of active cells may be sub-sampled and states of the sub-sampled cells may be stored in the temporal memory segments of the cell. For example, when cell Z1 is first activated, cell Z1 could receive activation states of all active cells (e.g., 50 cells) at this time step but stores information for only a select number of cells (e.g., 10 cells). The sub-sampling of cells may also contribute to generalization of spatial patterns and/or temporal sequences.

In one embodiment, each temporal memory segment stores the activation states of the same number of cells. In another embodiment, each temporal memory segment stores the activation states of a different number of cells.

When a cell detects activation of all or over a percentage of cells stored in its temporal memory segments, the cell enters into a predictive state and produces a pooling output 622 indicating its predictive state. This transition is predictive in nature because the transition to the predictive state is based on activation of other connected cells and not based on receiving a column activation signal (via select signal 646) to activate the cell.

For example, a cell may become predictive when more than 90% of cells identified in a temporal memory segment are active. Under certain conditions, the cell may also produce sequence output 714 sent to other cells to indicate its activation state. In one embodiment, a cell becomes predictive when a fixed number of cells or more than a threshold percentage of cells stored in one of its temporal memory segments become active. In other embodiments, the cells become predictive when the activation states of other cells partially or entirely match a list of stored activation states.

Figure 8:
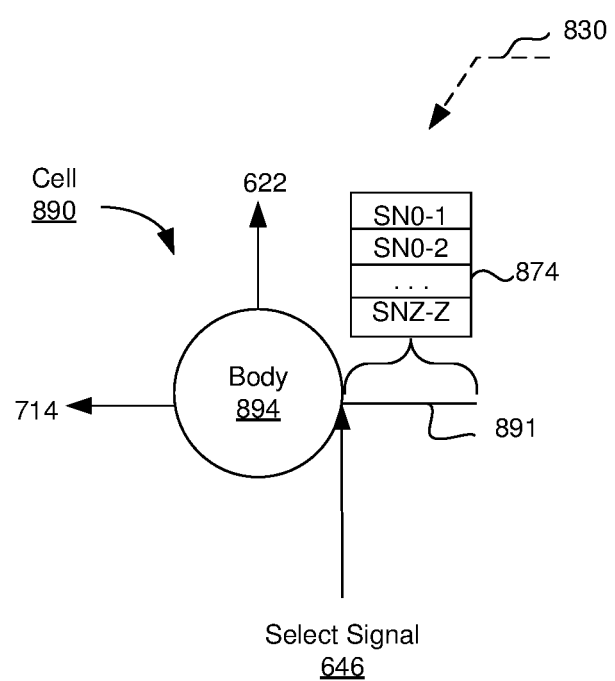
FIG. 8 is a conceptual diagram illustrating the operation of a cell, according to one embodiment.

FIG. 8 is a conceptual diagram illustrating signals associated with a cell 890, according to one embodiment. Cell 890 includes a body 894 and a dendrite 891. The dendrite 891 of cell 890 receives sequence inputs 830 and the body 894 of cell 890 receives select signal 646. Sequence inputs 830 are collective sequence outputs 714 sent out by other cells having connections with cell 890. Cell 890 establishes connections with the other cells during learning to monitor their activation states. Cell 890 also receives select signal 646. In one embodiment, the select signal 646 becomes active when: (i) cell 890 is in a predictive state, then transitions to an active state in response to the column activation signal 634, and/or (ii) cell 890 is not in a predictive state but is nonetheless selected for activation in response to the column activation signal 634. For example, the column containing cell 890 receives a column activation signal 634 but no cells in the column are in a predictive state, so the column manager selects cell 890 as a candidate cell for learning. In this example, cell 890 may be selected as a candidate cell according to a ranking of cells in the column by likelihood of entering the predictive state.

Activation states of other connective cells associated with the cell 890 transitioning to the predictive state may be stored in a table 874. Cell 890 generates pooling output 622 and sequence output 714 based on select signal 646 and sequence inputs 830. Pooling output 622 is generated whenever cell 890 becomes active or predictive. Sequence output 714 is generated when certain conditions are met, as described below in detail with reference to FIG. 9

Figure 9:
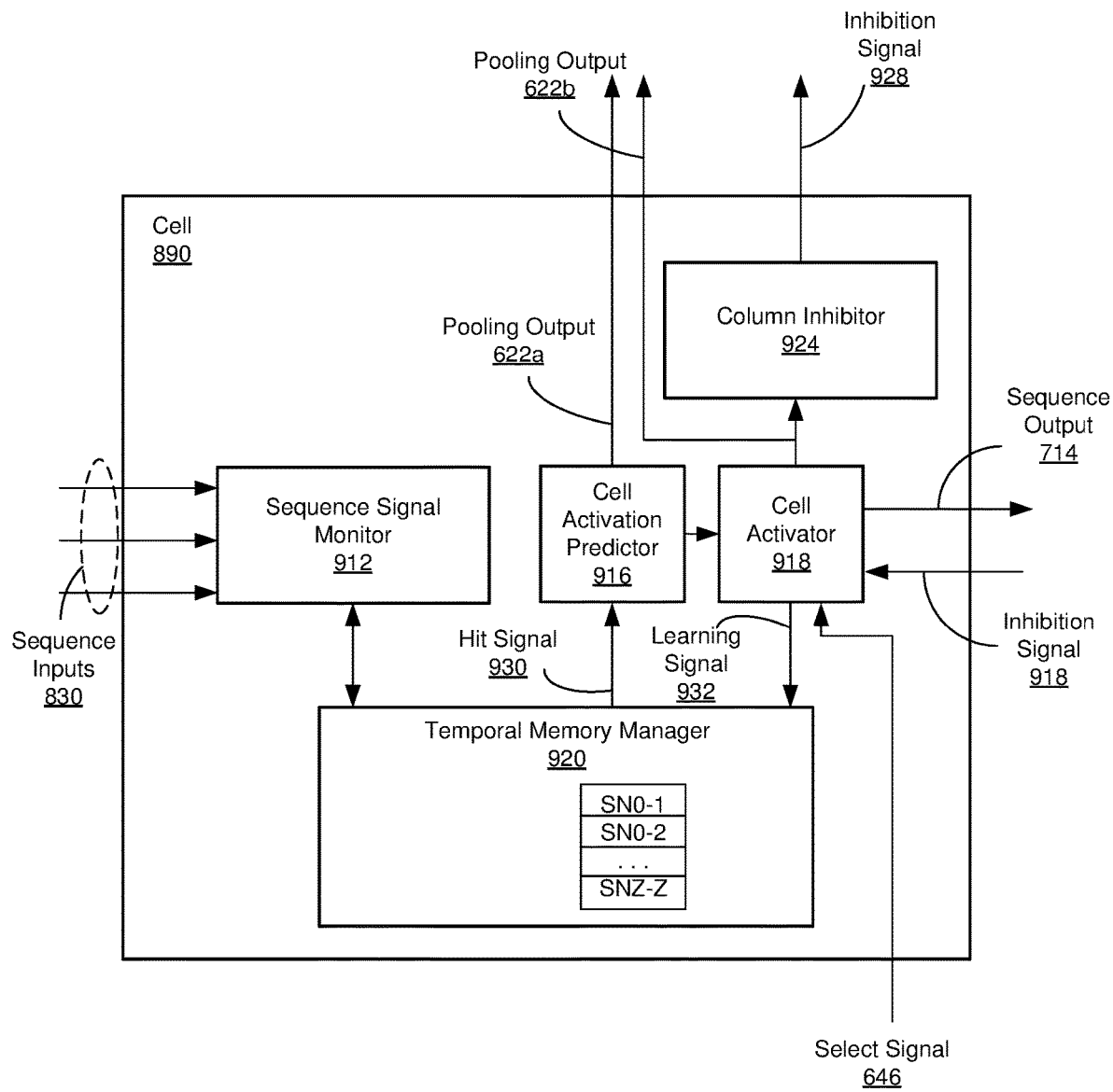
FIG. 9 is a block diagram illustrating a cell, according to one embodiment.

FIG. 9 is a functional block diagram illustrating cell 890, according to one embodiment. Cell 890 may include, among other components, a sequence signal monitor 912, a cell activation predictor 916, a cell activator 918, a temporal memory manager (TMM) 920, and a column inhibitor 924. The sequence signal monitor 912 is software, firmware, hardware or a combination thereof for receiving sequence inputs 830 from other cells in the same processing node or level. The sequence signal monitor 912 buffers sequence inputs 912. The stored sequence inputs 912 are referenced by TMM 920 for processing.

TMM 920 is software, firmware, hardware, or a combination thereof for managing temporal memory segments. TMM 920 performs various operations associated with writing, updating, retrieving, and comparing cell activation states. As described above in detail with reference to FIG. 8, cell activation states stored in different temporal memory segments of TMM 920 represent activation states of other cells at different times. When learning is activated, TMM 920 detects current and/or previous states of cell activations based on the sequence inputs 830 and stores the detected cell activation states in temporal memory segments. TMM 920 also compares the sequence inputs 830 to cell activation states stored in temporal memory segments. If the sequence inputs 830 indicate that (i) all elements of a temporal memory segment are active or (ii) a number or percentage of elements of a temporal memory segment above a threshold is active, TMM 920 sends hit signal 930 to cell activation predictor 916. The hit signal 930 indicates that the cell is in a predictive state due to activation of cells whose activation corresponded to subsequent activation of the cell 890. The temporal memory manager 920 may activate learning in response to (i) sending the hit signal 930 indicating that the cell is in a predictive state, or (ii) receiving learning signal 932 indicating that the cell in in an active state.

Cell activation predictor 916 receives hit signal 930 from TMM 920 and generates pooling output 622*a* indicating that the cell 890 is in a predictive state. The cell activation predictor 916 may send indications of the cell's previous predictive states to the cell activator 918. For example, the cell activation predictor 916 indicates to the cell activator 918 whether the cell 890 was in a predictive state during a last time step.

The cell activator 918 receives the select signal 646 and the inhibition signal 918 and places the cell 890 in an activated state when certain conditions are met. If the cell 890 is placed in an activated state, the cell activator 918 generates pooling output 622*b*, sequence output 714, and learning signal 932.

One condition for cell activation is that there be no inhibition signals 918 from other cells in the same column or in a different column. If inhibition signal 918 is received from other cells, cell 890 is not activated despite select signal 646. In one embodiment, pooling output 622*b* is generated regardless of the reasons cell 890 is activated whereas sequence output 714 is generated under certain conditions. Specifically, the sequence output 714 is generated (i) when the activation of cell 890 was predicted based activation states of other cells and (ii) the prediction of the cell 890 turned out to be correct. By generating sequence output 714 only when the prediction of the cell 890 was correct, other cells connected to cell 890 learn temporal sequences that are productive to correct prediction while discarding meaningless or noisy temporal sequences that do not contribute to prediction. Alternatively, the sequence output 714 is generated even when the activation of the cell 890 was inaccurately predicted. The sequence output 714 and/or the pooling output 622*b* indicate that the cell 890 is activated for a longer time to enable more connected cells to learn the activation state of the cell 890 while the sequence output 714 is activated for a short time when the activation of the cell 890 was inaccurately predicted.

In response to activation of the cell 890 by the cell activator 918, column inhibitor 924 generates inhibition signal 928. Inhibition signals are sent to other cells in the same column or in a different column to inhibit activation of the other cells. The cells communicating the inhibition signals may be within a predefined inhibition range, as described above in detail with reference to FIG. 3.

In one embodiment, TMM 920 uses a dynamic threshold for generating hit signal 930. Specifically, TMM 920 dynamically adjusts the number or percentage of elements of sequence inputs 830 that should match the elements stored in a temporal memory segment or an activation window before hit signal 930 can be generated.

The cell 890 transitioning to a predictive state represents a prediction based on activation of other cells in sequence processor 314. By lowering the number of percentage of coinciding elements to generate hit signal 930, the cell 890 may be activated more frequently. More frequent transitions of the cell 890 to the predictive state indicate making more liberal predictions for when the cell will be activated. Lowering the requirement for coinciding elements has a similar effect of forcing the cells or the temporal memory system to make predictions that would otherwise not be made. To the contrary, raising the requirement for coinciding elements has a similar effect of restricting the cells or the temporal memory system to making only conservative and limited predictions.

The threshold for generating the hit signal 930 may be adjusted by detecting activation states of cells corresponding to a certain segment of input space. If the level of cell activation for such a segment drops below a level, the dynamic threshold of cells for the segment of input space is lowered to prompt more transitions to the predictive state by cells. Conversely, if the level of cell activation of a segment of input space it above a level, the dynamic threshold may be increased to reduce transitions to the predictive state by cells.

In one embodiment, TMM 920 compares the activation and predictive states of cell 890 to the column activation signal 634 to determine if the cell activation states stored in a temporal memory segment resulted in improper transitions by cell 890 to the predictive state.

For each temporal memory segment or set of cell activation prediction states, TMM 920 tallies a productivity score that is increased or decreased depending on whether column activation signal 634 activating the column followed early transitions by cell 890 to the predictive state. If cell activation states stored in a temporal memory segment resulted in the cell 890 becoming predictive but the transition was not followed by column activation signal 634 activating the column, the productivity score for the cell activation states or temporal memory segment is reduced. Conversely, the productivity score is increased if the stored cell activation states or temporal memory segment contributed to correct activation of cell 890. If the productivity score drops below a threshold, the cell activation states are deleted or the temporal memory segment is initialized to "forget" the learned connections.

Example Architecture of Upper Processing Node

Figure 10:
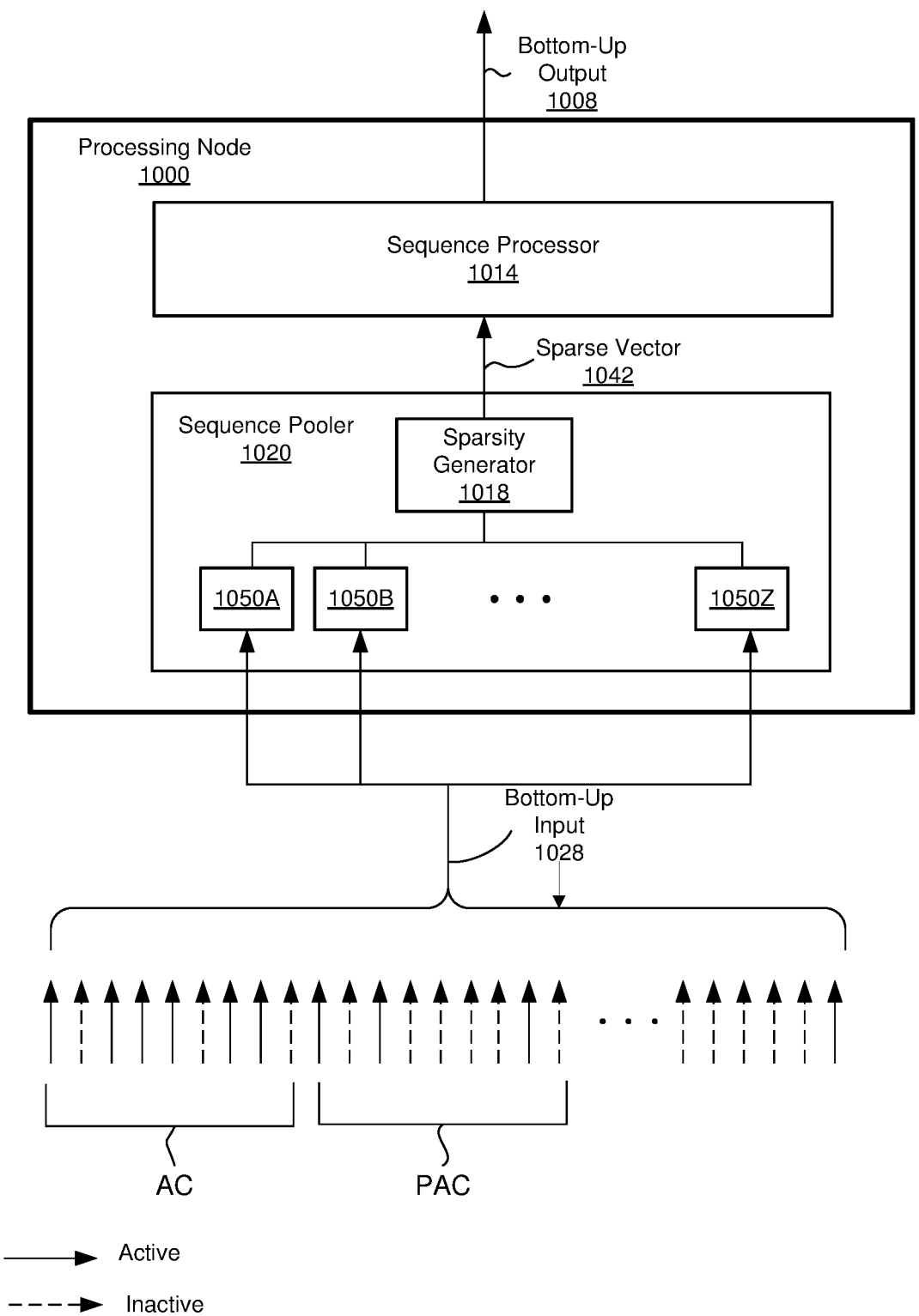
FIG. 10 is a block diagram illustrating an upper-layer processing node in a temporal memory system, according to one embodiment.

FIG. 10 is a block diagram illustrating an upper processing node 1000 in a temporal memory system, according to one embodiment. The processing node 1000 may be a processing node connected to a lower processing node 300 to receive bottom-up output 324. Processing node 1000 may include, among other components, a sequence processor 1014 and a sequence pooler 1020. Sequence pooler 1020 receives bottom-up input 1028 (includes bottom-up output 324 of FIG. 3 and other information such as action information) from a child node or children nodes (e.g., processing node 300), performs sequence pooling, and sends sparse vector 1042 indicating which of the cells in the sequence pooler 1020 are active.

The bottom-up input 1028 includes an active cells (AC) vector in a sparse distributed representation with active elements indicating active cells in the sequence processor 314 of the child processing node or children processing nodes (e.g., processing node 300). The bottom-up input 1028 may also include a predicted active cells (PAC) vector indicating active cells of the sequence processor 314 that are currently active and were previously predicted to become active or stay active.

Sequence processor 1014 receives the sparse vector 1042, performs temporal processing and generates the bottom-up output 1008. The bottom-up output 1008 represents information describing temporal sequences detected or predicted in the spatial patterns of the bottom-up input 1028. In one embodiment, the sequence processor 1014 has the same structure and function as the sequence processor 314 described above with reference to FIG. 6. Bottom-up output 1008 may be fed to a parent node, to another processing node 300, or to any other component for further processing (e.g., decoding).

Example Architecture of Sequence Pooler

Sequence pooler 1020 performs sequence pooling by producing the sparse vector 1042 in the form of a sparse distributed representation. Sequence pooling refers to grouping temporal sequences of spatial patterns and representing these sequences as a single vector. Sequence pooling may include both spatial pooling and a degree of temporal pooling (e.g., first order temporal pooling). For example, the sequence pooler 1020 may detect one or more distinct first order temporal sequences of spatial patterns in the bottom-up input 1028.

Sequence pooler 1020 has a structure and functions differently from spatial pooler 320 of FIG. 3. Specifically, sequence pooler 1020 includes a single layer of cells 1050A through 1050Z (hereinafter collectively referred to as "cells 1050") and a sparsity generator 1018. The number of cells corresponds to the number of columns in sequence processor 1014.

The sparsity generator 1018 generates a sparse vector 1042 from the outputs of the cells 1050. In some embodiments, the cells 1050 each output a signal indicating when they are active, and the sparsity generator 1018 concatenates the active signals into a sparse vector 1042 that includes active elements indicating which of the cells 1050 are active.

In some embodiments, the sparsity generator 1018 functions similarly to the sparsity generator 318 described in conjunction with FIG. 3. Specifically, the cells 1050 each output a signal indicating a strength of activation, and the sparsity generator 1018 selects one or more of the cells 1050 according to the strength of activation. The sparsity generator 1018 generates a sparsity vector 1042 that includes active elements corresponding to the selected cells 1050. For example, the sparsity generator 1018 may compare the strength of activation to a threshold strength of activation, or may rank the cells 1050 by their respective strengths of activation and select one or more cells having a ranking above a threshold ranking. As another example, the sparsity generator 1018 applies inhibition so that a cell 1050 with a high strength of activation inhibits selection of other cells 1050 proximate to the cell 1050.

Each of the cells 1050A through 1050Z have substantially the same structure and function as cell 890 described above with reference to FIGS. 8 and 9 except that TMM 920 of cells 1050A through 1050Z store activation states of a subset of active cells in sequence processor 314 of a lower processing node 300. In one embodiment, each of the cells 1050A through 1050Z is mapped to a subset of columns or cells in a lower node to receive activation state or predictive state of cells in the lower node.

Specifically, each of cells 1050A through 1050Z includes sequence memory segments that store activation states of a subset of cells in the sequence processor 314 when each of cells 1050A through 1050Z was active. The activation states of the subset of cells in the sequence processor 314 are indicated by the bottom-up input 1028. Each of the cells 1050A through 1050Z is associated with cells of the sequence processor 314 via the bottom-up input 1028.

When activated, a cell 1050 detects which of the cells in the sequence processor 314 connected to the cell 1050 were active and how many of these cells were predicted active cells (PACs). If the number of PACs exceeds a threshold ratio of the number of PACs against the number of ACs, the cell 1050 remains active beyond the current time step for a number (e.g., two or three) of times steps or alternately, for a fixed or variable period of time. The high number of PACs indicates that a temporal sequence of spatial sequences learned by the cell 1050 was correctly predicted, and hence, the cell 1050 may continue to learn subsequent activation states of cells in the sequence processor 314 by remaining active for a number of times steps after the current time step.

In one embodiment, an active cell 1050 is turned inactive immediately without staying active for further time steps when the number of PACs or the ratio of the number of PACs relative to the number of ACs drops below a threshold. The connection between the cells 1050A through 1050Z and the cells in the sequence processor 314 may be controlled by permanence values. The permanence value in the context of sequence pooler 1020 represents the contribution of an active cell of a sequence processor 314 of the lower processing node 300 to the activation of the cell in sequence pooler 1020. When a cell 1050 becomes active, the permanence values for connections to active cells in the sequence processor 314 are increased whereas the permanence values for connections to inactive cells in the sequence processor 314 are decreased. If a permanence value for a connection to a cell in the sequence processor 314 drops below a threshold value, the connection between the cell 1050 and the cell in the sequence processor 314 may be severed, so the activation of the cell in the sequence processor 314 no longer contributes to activation of the cell 1050. Similarly a connection between another cell in the sequence processor 314 and the cell 1050 may be established if the permanence value increases above a threshold value, so the activation of the cell in the sequence processor accordingly contributes to activation of the cell 1050. When a connection is severed between cell 1050 and a cell in the sequence processor 314, the sequence pooler 1020 maintains the permanence value and may continue to increase or decrease the permanence value in response to activation of the corresponding cell in the sequence processor 314. The threshold value for establishing a connection may be equal to or different from the threshold value for severing a connection. For example, the threshold value for establishing a connection exceeds the threshold value for severing a connection.

Which of the cells 1050A through 1050Z are to be activated is determined by the number of active cells in the sequence processor 314 connected to the cells 1050A through 1050Z whose permanence value is above a threshold value. As described above with reference to FIG. 9, inhibition signal 918 may be sent between cells 1050 within an inhibition zone to prevent certain cells from becoming active when a cell connected to these cells is active. After a cell 1050 is activated, hysteresis may be implemented to maintain the activated cell in an active state even when there is a competing cell that has the same number of connected cells active or a slightly higher number of connected cells active than the already active cell 1050.

Unpooling Operation

Unpooling refers to the operation of placing cells in a sequence processor of a lower processing node to a predictive state based on a feedback signal from an upper processing node. The cells set to the predictive state are not yet active, but are primed to become active when a column including the cell receives a selector signal 646, despite the presence of other cells in the column that should be activated according to the scheme described above in detail with reference to FIG. 6. In this way, context can be provided to a processing node to improve recognition of patterns in ambiguous inputs. Similarly, patterns corresponding to behaviors in a sequence can be evoked.

FIG. 11A is a schematic diagram illustrating sending of a feedback signal 1102 from an upper node 1104 as part of an unpooling process to place cells of a lower node 1108 in a predictive state, according to one embodiment. The upper node 1104 includes, among other components, a sequence pooler 1130. The lower node 1108 includes, among other components, a spatial pooler 1110 and a sequence processor 1120. The structure and functions of sequence pooler 1130 are substantially the same as those of sequence pooler 1020, described above with reference to FIG. 10, except that a feedback signal 1102 may be sent from each cell of the sequence pooler 1130 to the cells of the sequence processor 1120. The structures and functions of spatial pooler 1110 and sequence processor 1120 are substantially the same as those of spatial pooler 320 and sequence processor 314, respectively, as described above with reference to FIG. 3.

When focusing on or giving attention to a certain temporal sequence, one or more cells in sequence pooler 1130 corresponding to the focused temporal sequence are selected. Then a feedback signal 1102 is sent from the selected cells of the sequence pooler 1130 to cells in the sequence processor 1120 connected to the selected cells. The feedback signal 1102 causes the connected cells in the sequence processor 1120 to be placed in a predictive state.

FIG. 11B is a schematic diagram illustrating operation after placing cells of sequence processor 1120 in predictive states, according to one embodiment. Spatial pooler 1110 receives a bottom-up input 1122 and then generates sparse vector 1124, as described above in detail with reference to FIG. 3.

If there are any predictive cells in the columns selected for activation by the sparse vector 1124, these predictive cells are activated despite presence of other cells in the column that would otherwise have been activated according to the scheme described above in detail with reference to FIG. 3. If there are no predictive cells in the column selected for activation by the sparse vector 1124, a cell may be selected from the column according to the scheme described above with reference to FIG. 3.

A bottom-up input 1134 is generated by the sequence processor 1120 to indicate the activated cells and is sent to the sequence pooler 1130. The sequence pooler 1130 may perform substantially the same operation as described above with reference to FIG. 10.

Figure 12:
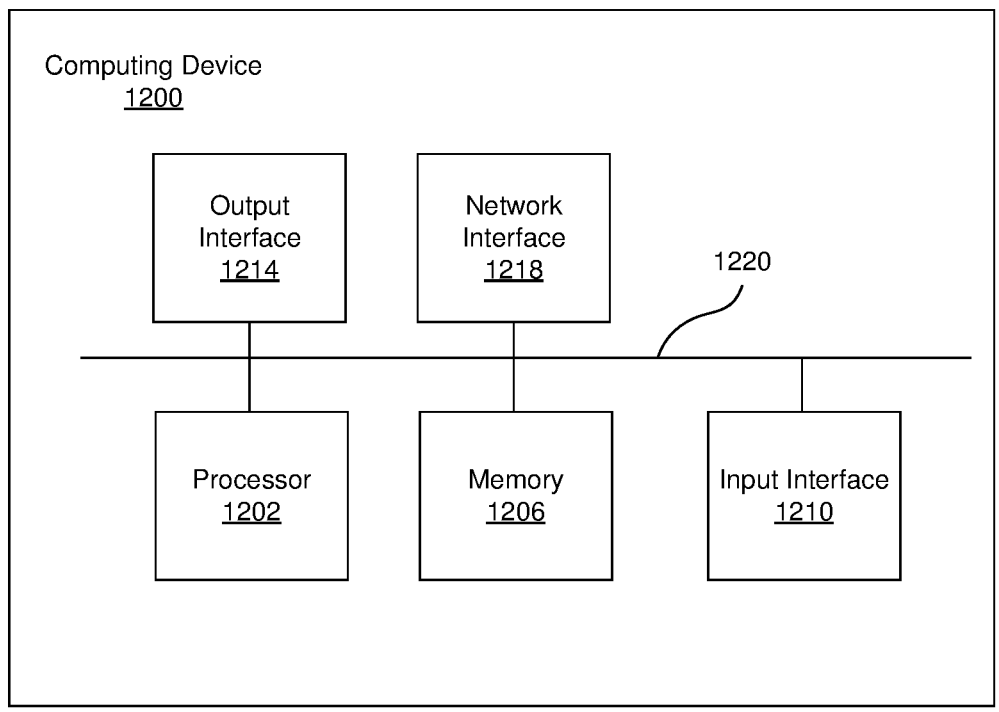
FIG. 12 is a block diagram of a computing device for implementing nodes according to embodiments.

FIG. 12 is a block diagram of a computing device 1200 for implementing nodes according to embodiments. The computing device 1200 may include, among other components, a processor 1202, a memory 1206, an input interface 1210, an output interface 1214, a network interface 1218 and a bus 1220 connecting these components. The processor 1202 retrieves and executes commands stored in memory 1206. The memory 1206 store software components including, for example, operating systems and modules for instantiating and executing nodes as described herein. The input interface 1210 receives data from external sources such as sensor data or action information. The output interface 1214 is a component for providing the result of computation in various forms (e.g., image or audio signals). The network interface 1218 enables the computing device 1200 to communicate with other computing devices by a network. When multiple nodes or components of a single node is embodied in multiple computing devices, information associated with temporal sequencing, spatial pooling and management of nodes may be communicated between computing devices via the network interface 1218.

Upon reading this disclosure, those of skill in the art will appreciate still additional alternative designs for processing nodes. Thus, while particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

The invention claimed is:

1. A computer-implemented method for temporal processing data, comprising:
   detecting a plurality of spatial patterns in an input data at a first time by a first node;
   generating a first sparse vector in a sparse distributed representation based on the plurality of spatial patterns detected at the first time;
   predicting spatial patterns to appear in the input data at a second time subsequent to the first time by processing the generated first sparse vector based on connections representing relationships of temporal sequences of spatial patterns in the input data detected before the first time;
   generating output vectors from the first node that vary over time based on the prediction, first elements of the output vectors maintained active for a first period of time responsive to prediction associated with the first elements as being determined inaccurate, second elements in the output vectors maintained active for a second period of time longer than the first period responsive to prediction associated the second elements determined as being accurate; and
   updating, as part of training, the connections based on activation of the first elements for the first period time and the second elements for the second period of time.

2. The method of claim 1, wherein predicting the spatial patterns in the input data at the second time comprises:
   each of a plurality of cells receiving sequence inputs indicating activation of connected cells; and
   placing each of the plurality of cells in a predictive state responsive determining that the sequence inputs indicate that more than a predetermined number or a portion of the connected cells are activated, the predictive state of the plurality of the cells indicated in the output vectors.

3. The method of claim 2, further comprising activating each of the plurality of cells responsive to the first sparse vector including an active element indicating activation of a corresponding column that includes each of the plurality of cells.

4. The method of claim 1, wherein each of the output vectors identifies which cells in the first node are active at a current time and which of the currently active cells in the first node were predicted at a previous time prior to the current time to become active.

5. The method of claim 4, further comprising:
   mapping each of a plurality of cells in a second node to a subset of cells in the first node;
   selecting a subset of the plurality of cells in the second node based on activation of the subset of cells in the first node mapped to the plurality of cells in the second node; and
   generating a second sparse vector in a sparse distributed representation indicating the selected subset of cells in the second node, activation period of elements of the second sparse vector determined at least on a number of mapped subset of cells in the first node that are active and were previously predicted to become active.

6. The method of claim 5, further comprising performing a temporal sequencing higher than a first order on the second sparse vector.

7. The method of claim 5, further comprising:
increasing a permanence value between each of the plurality of cells and a cell in the first node mapped to each of the plurality of cells responsive to the cell in the first node being active when each of the plurality of cells is activated; and
decreasing the permanence value between each of the plurality of cells and the cell in the first node mapped to each of the plurality of cells responsive to the cell in the first node being inactive when each of the plurality of cells is activated.

8. The method of claim 5, further comprising sending a feedback signal from the second node to the first node to place in a predictive state a subset of cells in the first node mapped to one or more of the plurality of cells in the second node.

9. The method of claim 8, wherein the subset of cells in the first node placed in the predictive state is prioritized for activation responsive to receiving the input data.

10. The method of claim 1, further comprising:
providing sensor data and action information associated with the sensor data as the input data;
temporally processing the output vectors at a second node connected to the first node to generate a first processed data;
providing the first processed data and the action information to a third node; and
temporally processing the first processed data and the action information to generate a second processed data.

11. A computing device, comprising:
a processor;
a first node comprising:
  a spatial pooler configured to detect a plurality of spatial patterns in an input data at a first time, and generate a first sparse vector in a sparse distributed representation based on the plurality of spatial patterns detected at the first time; and
  a sequence processor configured to:
    predict spatial patterns to appear in the input data at a second time subsequent to the first time by processing the generated first sparse vector based on connections representing stored relationships of temporal sequences of spatial patterns in the input data detected before the first time, and
    generate output vectors from the first node that vary over time based on the prediction, first elements of the output vectors maintained active for a first period of time responsive to prediction associated with the first elements as being determined inaccurate, second elements in the output vectors maintained active for a second period of time longer than the first period responsive to prediction associated the second elements determined as being accurate, and
    update, as part of training, the connections based on activation of the first elements for the first period of time and the second elements for the second period of time.

12. The computing device of claim 11, wherein the sequence processor predicts the spatial patterns in the input data at the second time by having each of a plurality of cells receive sequence inputs indicating activation of connected cells; and place each of the plurality of cells in a predictive state responsive determining that the sequence inputs indicate that more than a predetermined number or a portion of the connected cells are activated, the predictive state of the plurality of the cells indicated in the output vectors.

13. The computing device of claim 12, wherein the sequence processor is further configured to activate each of the plurality of cells responsive to the first sparse vector including an active element indicating activation of a corresponding column that includes each of the plurality of cells.

14. The computing device of claim 11, wherein each of the output vectors identifies which cells in the first node are active at a current time and which of the currently active cells in the first node were predicted at a previous time prior to the current time to become active.

15. The computing device of claim 14, further comprising a second node, the second node configured to:
map each of a plurality of cells to a subset of cells in the first node,
select a subset of the plurality of cells in the second node based on activation of the subset of cells in the first node mapped to the plurality of cells in the second node; and
generate a second sparse vector in a sparse distributed representation indicating the selected subset of cells in the second node, activation period of elements of the second sparse vector determined at least on a number of mapped subset of cells in the first node that are active and were previously predicted to become active.

16. The computing device of claim 15, wherein the second node is further configured to perform a temporal sequencing higher than a first order on the second sparse vector.

17. The computing device of claim 15, wherein the second node is further configured to:
increase a permanence value between each of the plurality of cells and a cell in the first node mapped to each of the plurality of cells responsive to the cell in the first node being active when each of the plurality of cells is activated; and
decrease the permanence value between each of the plurality of cells and the cell in the first node mapped to each of the plurality of cells responsive to the cell in the first node being inactive when each of the plurality of cells is activated.

18. The computing device of claim 15, wherein the second node is further configured to send a feedback signal from the second node to the first node to place in a predictive state a subset of cells in the first node mapped to one or more of the plurality of cells in the second node.

19. The computing device of claim 18, wherein the subset of cells in the first node placed in the predictive state is prioritized for activation responsive to receiving the input data.

20. The computing device of claim 11, further comprising:
a second node connected to the first node and configured to temporally process the output vectors to generate a first processed data; and
a third node connected to the second node and configured to receive the first processed data and action information associated with sensor data, and temporally process the first processed data and the action information to generate a second processed data, the sensor data and the action information received at the first node as the input data.

* * * * *